United States Patent
Allen et al.

(10) Patent No.: US 8,239,875 B2
(45) Date of Patent: Aug. 7, 2012

(54) COMMAND QUEUING FOR NEXT OPERATIONS OF MEMORY DEVICES

(75) Inventors: Walter Allen, Wellington, CO (US); Sunil Atri, Austin, TX (US); Joseph Khatami, Austin, TX (US)

(73) Assignee: Spansion LLC, Sunnyvale, CA (US)

( * ) Notice: Subject to any disclaimer, the term of this patent is extended or adjusted under 35 U.S.C. 154(b) by 1205 days.

(21) Appl. No.: 11/962,918

(22) Filed: Dec. 21, 2007

(65) Prior Publication Data

US 2009/0165020 A1    Jun. 25, 2009

(51) Int. Cl.
*G06F 9/305* (2006.01)
(52) U.S. Cl. ........ 719/314; 711/103; 711/127; 711/157; 711/168; 711/169
(58) Field of Classification Search .................. None
See application file for complete search history.

(56) References Cited

U.S. PATENT DOCUMENTS

| | | | |
|---|---|---|---|
| 2006/0168418 A1* | 7/2006 | Adusumilli | 711/169 |
| 2007/0150687 A1* | 6/2007 | Chen et al. | 711/168 |
| 2008/0098195 A1* | 4/2008 | Cheon et al. | 711/202 |
| 2008/0270680 A1* | 10/2008 | Chang | 711/103 |
| 2009/0157949 A1* | 6/2009 | Leibowitz | 711/103 |

OTHER PUBLICATIONS

Micron, NAND Flash 101: An Introduction to NAND Flash and how to design it in to your next product, Nov. 2006.*

* cited by examiner

*Primary Examiner* — S. Sough
*Assistant Examiner* — Syed Roni
(74) *Attorney, Agent, or Firm* — Turocy & Watson, LLP

(57) ABSTRACT

Systems and/or methods that facilitate transferring data between a processor component and memory components are presented. A transfer controller component facilitates controlling data transfers in part by receiving respective subsets of data from respective memory components and arranging the respective subsets of data based in part on a desired predefined data order. The processor component generates a transfer map that includes information to facilitate arranging data in a predefined order. The processor component generates respective subsets of commands that are provided to queue components in respective memory components to retrieve desired data from the respective memory components. Each memory component services the commands in its queue component in an independent and parallel manner, and transfers the data retrieved from memory to the transfer controller component, which can arrange the received data in a predefined order for transfer to the processor component.

20 Claims, 12 Drawing Sheets

COMMAND QUEUING FOR NEXT OPERATIONS OF MEMORY DEVICES

TECHNICAL FIELD

The subject innovation relates generally to memory systems and in particular to systems and methods for transferring information to and/or from memory devices.

BACKGROUND

A wide variety of memory devices can be used to maintain and store data and instructions for various computers and similar systems. In particular, flash memory is a type of electronic memory media that can be rewritten and that can retain content without consumption of power. Unlike dynamic random access memory (DRAM) devices and static random memory (SRAM) devices in which a single byte can be erased, flash memory devices are typically erased in fixed multi-bit blocks or sectors. Flash memory technology can include NOR flash memory and/or NAND flash memory, for example. NOR flash memory evolved from electrically erasable read only memory (EEPROM) chip technology, in which, unlike flash memory, a single byte can be erased; and NAND flash memory evolved from DRAM technology. Flash memory devices typically are less expensive and denser as compared to many other memory devices, meaning that flash memory devices can store more data per unit area.

Flash memory has become popular, at least in part, because it combines the advantages of the high density and low cost of EPROM with the electrical erasability of EEPROM. Flash memory is nonvolatile; it can be rewritten and can hold its content without power. It can be used in many portable electronic products, such as cell phones, portable computers, voice recorders, thumbnail drives and the like, as well as in many larger electronic systems, such as cars, planes, industrial control systems, etc. The fact that flash memory can be rewritten, as well as its retention of data without a power source, small size, and light weight, have all combined to make flash memory devices useful and popular means for transporting and maintaining data.

Typically, when data is stored in a physical location (e.g., physical block address (PBA)) in a memory device, a logical block address (LBA) can be associated with the data to facilitate retrieval of the data from the memory by a host. An address translation table can be used to store the translations of LBAs to the PBAs. When the host requests data from or desires to write data to a particular LBA, the address translation table can be accessed to determine the PBA that is associated with the LBA. The LBA associated with the data can remain the same even if the PBA where the data is stored changes. For example, a block of memory containing the PBA can have antiquated data in other memory locations in the block. The block of memory can be erased to reclaim the block, and valid data stored in the block, including the data in the PBA, can be moved to new physical locations in the memory. While the PBA of the data is changed, the LBA can remain the same. The address translation table can be updated to associate the new PBA with the LBA.

When a host processor desires to access a memory location, the host processor can send a search command to the memory that specifies the LBA the host processor wants to access. The LBA can be associated with a PBA, where the PBA can be in a block of memory that can contain a plurality of pages, for example, 512 pages. Once the desired physical memory location is verified, the data can be loaded and transferred to the host processor.

Typically, when a host processor desires a significant amount of data that is stored across more than one memory component, each memory component is issued a command to load and transfer data stored in that particular memory component. When one of the memory components finishes loading a piece of data associated with its load and transfer command, that memory component sits idle and/or does not transfer the loaded data until the other memory components have completed their loading of data, because the host processor expects the data to be transferred to it in a particular order. As a result, there can be a significant amount of time wasted as memory components sit idle with loaded data waiting for transfer to the host processor.

It is desirable for a memory component to be able to load and transfer data without regard to the status of other memory components. It is also desirable to reduce the amount of idle time of memory components, for example, with regard to data transfers. Further, it is desirable to improve system performance with regard to data transfers.

SUMMARY

The following presents a simplified summary of the innovation in order to provide a basic understanding of some aspects described herein. This summary is not an extensive overview of the disclosed subject matter. It is intended to neither identify key or critical elements of the disclosed subject matter nor delineate the scope of the subject innovation. Its sole purpose is to present some concepts of the disclosed subject matter in a simplified form as a prelude to the more detailed description that is presented later.

The disclosed subject matter relates to systems and/or methods that can facilitate transferring data associated with one or more memory components (e.g., flash memory). In accordance with an aspect of the disclosed subject matter, a transfer controller component can be employed to facilitate transfers of data between one or more memory components and a processor component. Typically, in part to facilitate wear leveling of memory components, data can be written to memory such that subsets of the data can be striped across multiple memory components. Also, each subset of data and/or the physical location in which each subset of data is stored can be respectively associated with logical block addresses (hereinafter also referred to as "LBAs") in the respective memory component. When the processor component desires to access (e.g., read) the data, for example as part of an operation (e.g., read, write, erase, verify), the processor component can issue one or more commands to one or more memory components to locate the desired LBAs in order to locate the physical location of each subset of data in the respective memory components. In accordance with an aspect, each memory component can provide search result information that can indicate the physical location of each subset of data.

In one aspect, the processor component can generate a transfer map, based in part on the search result information, that can include information regarding the LBAs, the respective physical block addresses (hereinafter also referred to as "PBAs") (e.g., physical memory location, such as block number, page number, etc.), memory component identification information, etc. to facilitate transferring the data in a predefined order, as desired, for example, by the processor component. The processor component can transmit the transfer map to the transfer controller component, which can utilize the transfer map to arrange data transferred from the memory components into the predefined order. In another aspect, the processor component can generate commands (e.g., load and transfer commands) that can be provided to the memory components, where each memory component can receive a subset of the commands that can be respectively associated with the subset(s) of data stored in that particular memory component.

In embodiment, each memory component can contain and/or be associated with a queue component in which the subset of commands can be stored. In accordance with another embodiment, each memory component can be associated with a respective queue component, where the queue components can be contained in the transfer controller component. Each memory component can begin servicing the commands in its associated queue component, for example, in a first-in-first-out order. The memory component can load the subset of data associated with a command in its buffer component, and can indicate to the transfer controller component that the data is ready for transfer. In one aspect, the memory component can transfer the subset of data associated with that command to the transfer controller component, which can store the subset of data in the transfer buffer component, where the subset of data can be placed in a desired order based in part on the transfer map. In still another aspect, the transfer controller component and/or memory component can review the associated queue component to determine whether there is another command, and if so, the memory component can proceed to service the next command in its associated queue component. Such memory component does not have to wait for the other memory components to complete their load and transfer of their current commands before servicing its next command, as compared to conventional systems, where a memory component that completes a load of data before other memory components can sit idle waiting for the other components to complete their loading of data.

In still another aspect, each memory component can service the commands in its associated queue component in parallel and/or an interleaved manner with the other memory components until the subsets of data are all transferred to the transfer buffer component, where the transfer controller component can arrange the subsets of data in order according to the predefined order, for example, as provided in the transfer map. In one aspect, if the transfer buffer component does not contain enough space for all data associated with the operation, a memory component can have the loaded data remain stored in its buffer component until space is available in the transfer buffer component. In yet another aspect, the transfer controller component can arrange the subsets of data based in part on the predefined order, which can be specified in the transfer map. The transfer controller component can transmit the data in the predefined order to the processor component.

In accordance with still another aspect, methods that can facilitate transferring data associated with one or more memory components are presented. In another aspect, electronic devices that can comprise one or more memory components and a transfer controller component, and/or a system (s) that can facilitate data transfers associated with one or more memory components, in accordance with the disclosed subject matter, are presented.

The following description and the annexed drawings set forth in detail certain illustrative aspects of the disclosed subject matter. These aspects are indicative, however, of but a few of the various ways in which the principles of the innovation may be employed and the disclosed subject matter is intended to include all such aspects and their equivalents. Other advantages and distinctive features of the disclosed subject matter will become apparent from the following detailed description of the innovation when considered in conjunction with the drawings.

DETAILED DESCRIPTION

Figure 1A:
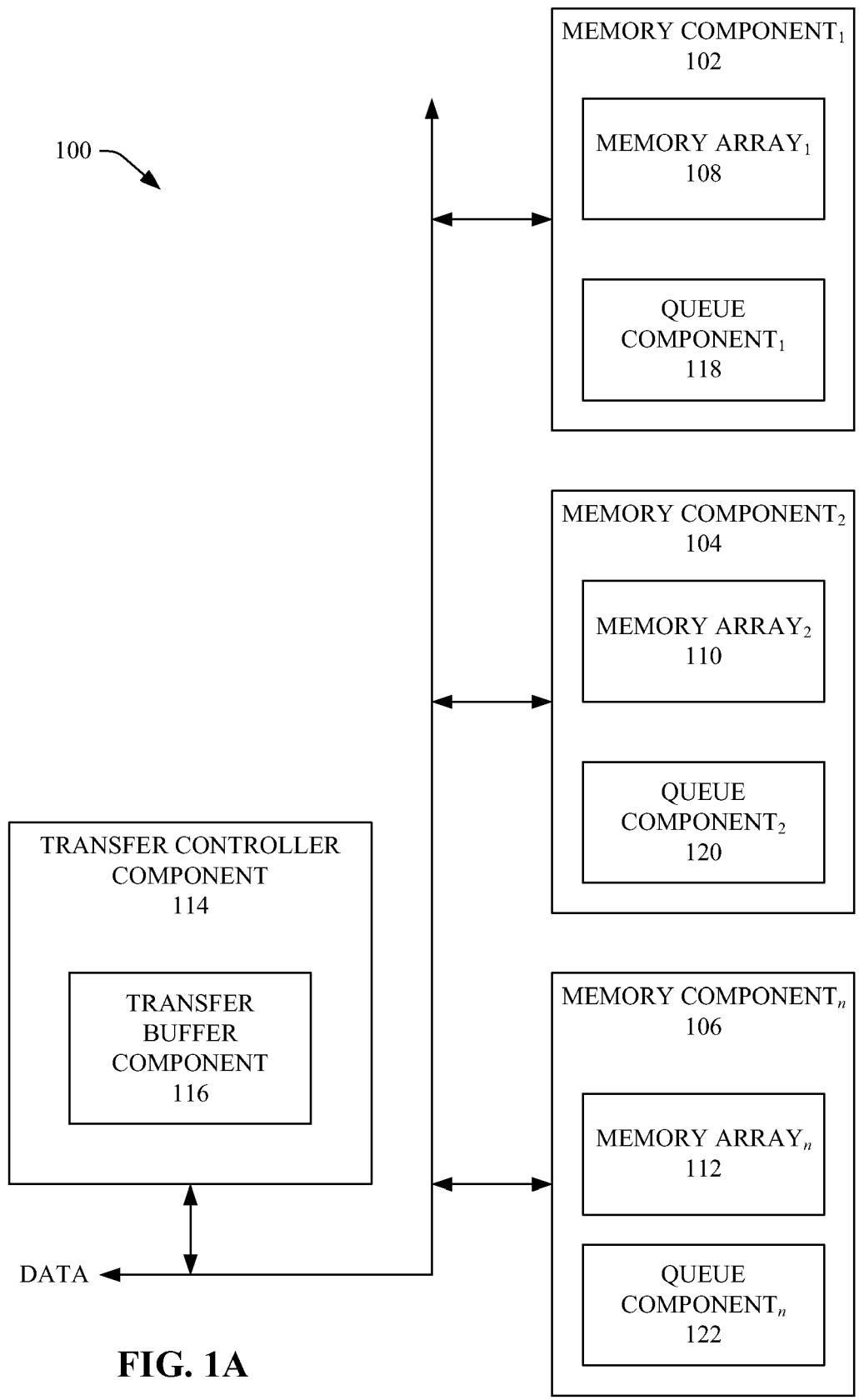
FIG. 1A illustrates a block diagram of a system that can facilitate transfers of data associated with memory components in accordance with an embodiment of the subject matter disclosed herein.

The disclosed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the disclosed subject matter may be practiced without these specific details. In other instances, well-known structures and devices are shown in block diagram form in order to facilitate describing the subject innovation.

Conventionally, when there are multiple memory components associated with a processor, data can be striped across the memory components during a write operation, such that subsets of the data can be stored in various physical locations in the respective memory components. During data transfers (e.g., reading and transferring data from the memory components), each memory component can process a command and the processor will wait until all the memory components are finished loading the data before retrieving the data from the memory components, as the processor typically desires the data to be in a particular order when presented to the processor. Thus, if a memory component finishes a loading of data before another memory component(s), that memory component can sit idling with a load of data in its buffer waiting for the other memory components to finish processing their respective commands. As a result, there can be a significant amount of time that is utilized by the memory components to simply wait for other memory components to complete their jobs.

Systems and/or methods are presented that can facilitate transferring data between memory components and a processor component in an efficient manner. In one aspect, a transfer controller component can be employed to facilitate controlling data transfers between the processor component and memory components. The processor component can generate a transfer map(s) based in part on search results regarding the physical location of data associated with logical block addresses (hereinafter also referred to as "LBAs") in respective memory components. The processor component can provide the transfer map to the transfer controller component, which can utilize the transfer map to facilitate arranging data in a predefined order, as desired by the processor component. The processor component can generate load and transfer commands that can be provided to each memory component, where each memory component can contain a queue component wherein a subset of commands related to the memory component can be stored.

In one aspect, each memory component can service the commands in its associated queue component independent of the other memory components, such that when a memory component loads data associated with a command, the memory component can transfer the data to the transfer controller component, where the data can be stored in a desired order in a transfer buffer component based in part on the transfer map. The data transfer can occur even when another memory component(s) has not completed servicing its command. The memory component can receive the next command from its associated queue component and can service its next command(s), if any. The memory components can continue servicing their respective commands until all of the subsets of data associated with the operation are transferred to the transfer controller component, where the subsets of data can be placed in a predefined order based in part on the transfer map, and provided to the processor component.

Figure 6:
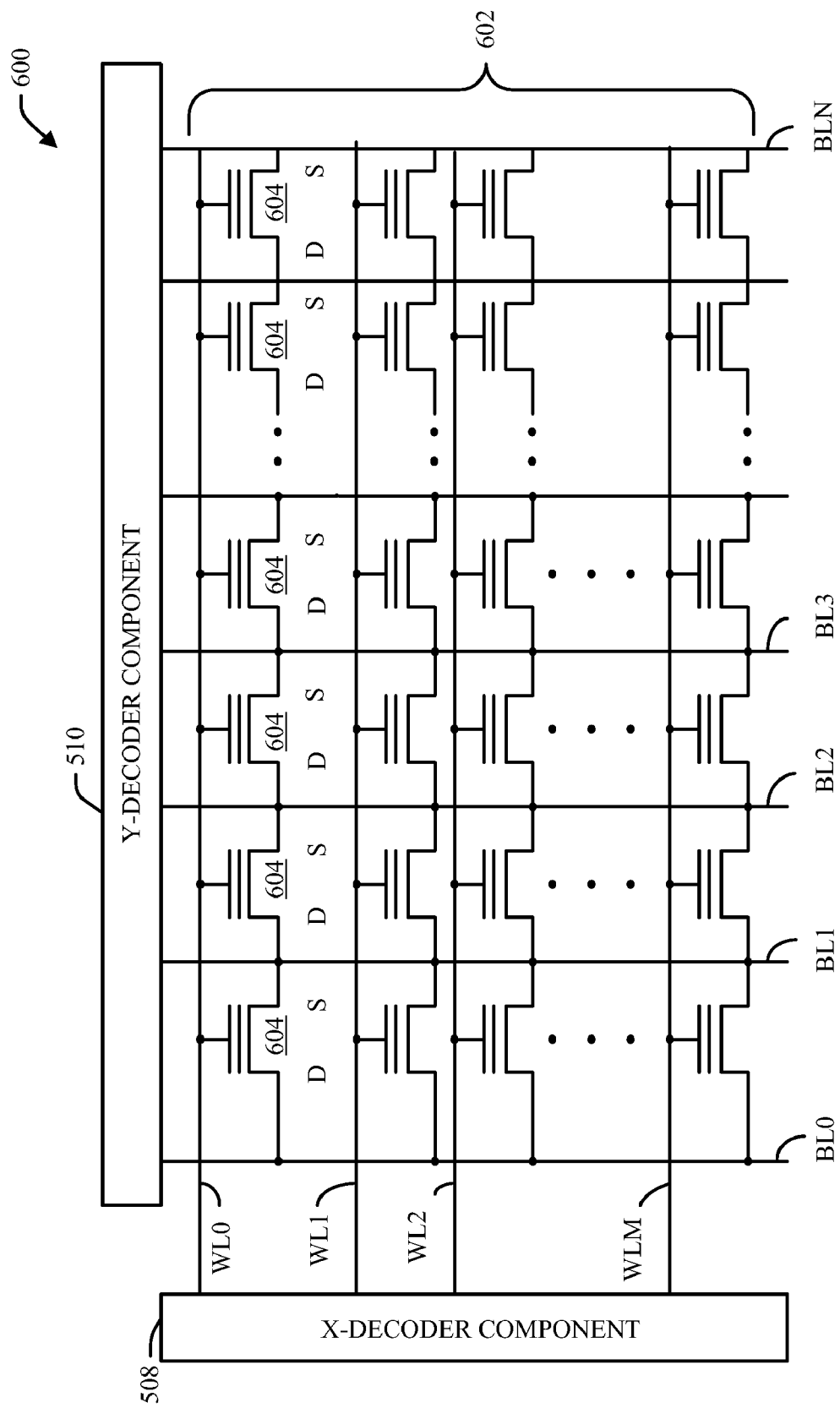
FIG. 6 illustrates a diagram of a portion of a memory array that can facilitate data storage in accordance with an aspect of the disclosed subject matter.

Turning to the figures, FIG. 1A illustrates a system 100 that can facilitate data transfers associated with memory components in accordance with an embodiment of the disclosed subject matter. System 100 can include a plurality of memory components, such as memory component$_1$ 102, memory component$_2$ 104, and up through memory component$_n$ 106, where n can be virtually any integer number. Each memory component 102, 104, 106 can be comprised of non-volatile memory (e.g., flash memory) and/or volatile memory (e.g., random access memory (RAM)). Each memory component 102, 104, 106 can receive information, including data, commands, and/or other information, which each such memory component 102, 104, 106 can process (e.g., store data, execute commands, etc.). Each memory component 102, 104, 106 can include a respective memory array(s), such as memory array$_1$ 108, memory array$_2$ 110, and up through memory array$_n$ 112. Each memory array 108, 110, 112 can receive and store data and can respectively contain a plurality of memory cells (not shown in FIG. 1A; as depicted in FIG. 6) wherein each memory cell can store one or more bits of data. Data stored in a memory cell(s) in a respective memory array 108, 110, 112 can be read from such memory cell(s) and such data can be provided as an output, or can be erased from the memory cell(s).

Conventionally, when data is desired from one or more memory components (e.g., flash memory), a processor component (e.g., host processor) can issue commands to the desired memory components, where a command can specify which memory component is to be accessed, a memory location to access in the memory component, etc. Typically, to facilitate wear leveling of the memory components, the desired data can be striped across multiple memory components when written to memory such that a portion of the data can be stored in one memory component, another portion of the data can be stored in another memory component, and so on, until all the data is written to and stored in the memory components.

Conventionally, during read operations, each memory component can receive respective commands and can load the respective portion of the desired data that is stored in such memory component into an internal buffer so such portion of data can be ready to be transferred to the processor component. Often, certain memory components down the line from the first memory component (and/or other memory components further up the line) can finish retrieving and loading the respective portions of data into internal buffers prior to the first (or other up-line) memory component. In such instances, the respective portions of data can reside in the internal buffers until all of the memory components have finished retrieving and loading the respective portions of the desired data. The data can be provided to the processor component when all the desired data is loaded to be transferred. As a result, the memory components that completed loading of their respective portions of data before the memory component that was last to finish can remain idle as such memory components wait for the other memory component(s) to complete their respective loading of data.

Further, some memory components can have more than one portion of desired data stored therein associated with a series of commands associated with desired data. Once such a memory component has completed the first retrieval and loading of a portion of the desired data, the memory component can remain idle until the loaded data is transferred to the processor component, even though there is another portion(s) of the desired data stored therein that is yet to be retrieved and loaded. As a result, in conventional systems, there can be significant latency with regard to retrieving, loading, and transferring desired data stored in memory components.

In accordance with one aspect, the subject innovation can facilitate transferring loaded data from memory components (e.g., 102, 104, 106) as each memory component completes a load of data, even if the data transfer is not in order, for example, due to a down line memory component completing a search before an up line memory component or is not in order for another reason. In another aspect, such memory component can service the next command to retrieve another portion of the desired data stored therein, even if the other memory component(s) is still servicing the current command. As a result, there can be a significant reduction in latency associated with retrieving, loading, and transferring data from memory, as compared to conventional systems.

In accordance with an aspect of the disclosed subject matter, a transfer controller component 114 can facilitate transfers of data from the respective memory components 102, 104, 106 such that data retrieved and loaded by a particular memory component can be transferred to the transfer controller component 114 where such data can be stored in a respective location in a transfer buffer component 116 within the transfer controller component 114. As a result, the particular memory component can be free to retrieve and load data stored therein based in part on the next command(s), even if another memory component(s) has not yet completed retrieving and loading desired data based on its current command. Even though data can be provided to the transfer controller component 114 out of order, the transfer controller component 114 can re-order (e.g., arrange) or place the transferred data in a desired order in the transfer buffer component 116.

In accordance with one aspect, to facilitate a proper ordering of the data transferred to the transfer controller component 114, the transfer controller component 114 can receive a transfer map that can include information identifying a memory component(s) (e.g., 102, 104, 106) in which a portion(s) (e.g., subset(s)) of the desired data (e.g., page(s) of data) resides, the logical block address associated with each respective portion of the data, and/or the physical block address (e.g., page number, block number, etc.) associated with each respective portion of the data. The transfer map can be based in part on information received from the respective memory components 102, 104, 106 in response to search commands issued to the respective memory components requesting that the respective memory components search their respective memory arrays 108, 110, 112 for LBAs stored in the respective memory arrays 108, 110, 112. Each memory component 102, 104, 106 can search their respective memory arrays 108, 110, 112 to locate the desired LBAs, which can be respectively associated with physical block addresses (hereinafter also referred to as "PBAs") in the memory arrays 108, 110, 112. Each memory component 102, 104, 106 can provide a response indicating at what physical location (e.g., page number, block number, etc.) in the respective memory arrays 108, 110, 112 the desired LBAs and/or associated portions of data are stored.

In accordance with an aspect, the transfer map can be provided to the transfer controller component 114 so that the transfer controller component 114 can have knowledge regarding the data, and the predefined order of the data, that is stored in each memory component 102, 104, 106 to facilitate placing the data received from each of the memory components 102, 104, 106 in a desired predefined order in the transfer buffer component 116, even though the data can be received by the transfer controller component 114 out of order, so that the data can be provided as an output from the transfer controller component 114 in the desired predefined order.

In accordance with another aspect, based in part on the information associated with the transfer map (e.g., search results from each memory component 102, 104, 106), a series of load and transfer commands can be generated. Each command of the series of load and transfer commands can contain information specifying the particular memory component to which the command is directed, the LBAs, the physical location (e.g., PBAs) to be accessed (e.g., to read data), and/or other information.

In still another aspect, each memory component 102, 104, 106 can comprise a respective queue component, such as queue component$_1$ 118, queue component$_2$ 120, and queue component$_n$ 122, that can receive and store multiple commands, such as load and transfer commands, and the memory components 102, 104, 106 can execute the commands in their respective queue components 118, 120, 122. A series of commands (e.g., load and transfer commands) can be transmitted to the memory components 102, 104, 106, and the commands can be distributed to the respective queue components 118, 120, 122 of the memory components 102, 104, 106 based in part on the command information specifying the particular memory component to which the command is directed and in which the desired data associated with the command is stored. Each queue component 118, 120, 122 can receive the commands directed to its respective memory component 102, 104, 106 and such commands can be stored therein, respectively. Each memory component 102, 104, 106 can begin servicing the first command contained in their respective queue components 118, 120, 122. The desired physical location, as specified in the command, can be accessed and the data (e.g., page) can be retrieved and loaded into a buffer component (e.g., as illustrated in FIG. 5 and described herein) that can be internal to the respective memory component 102, 104, 106.

Figure 5:
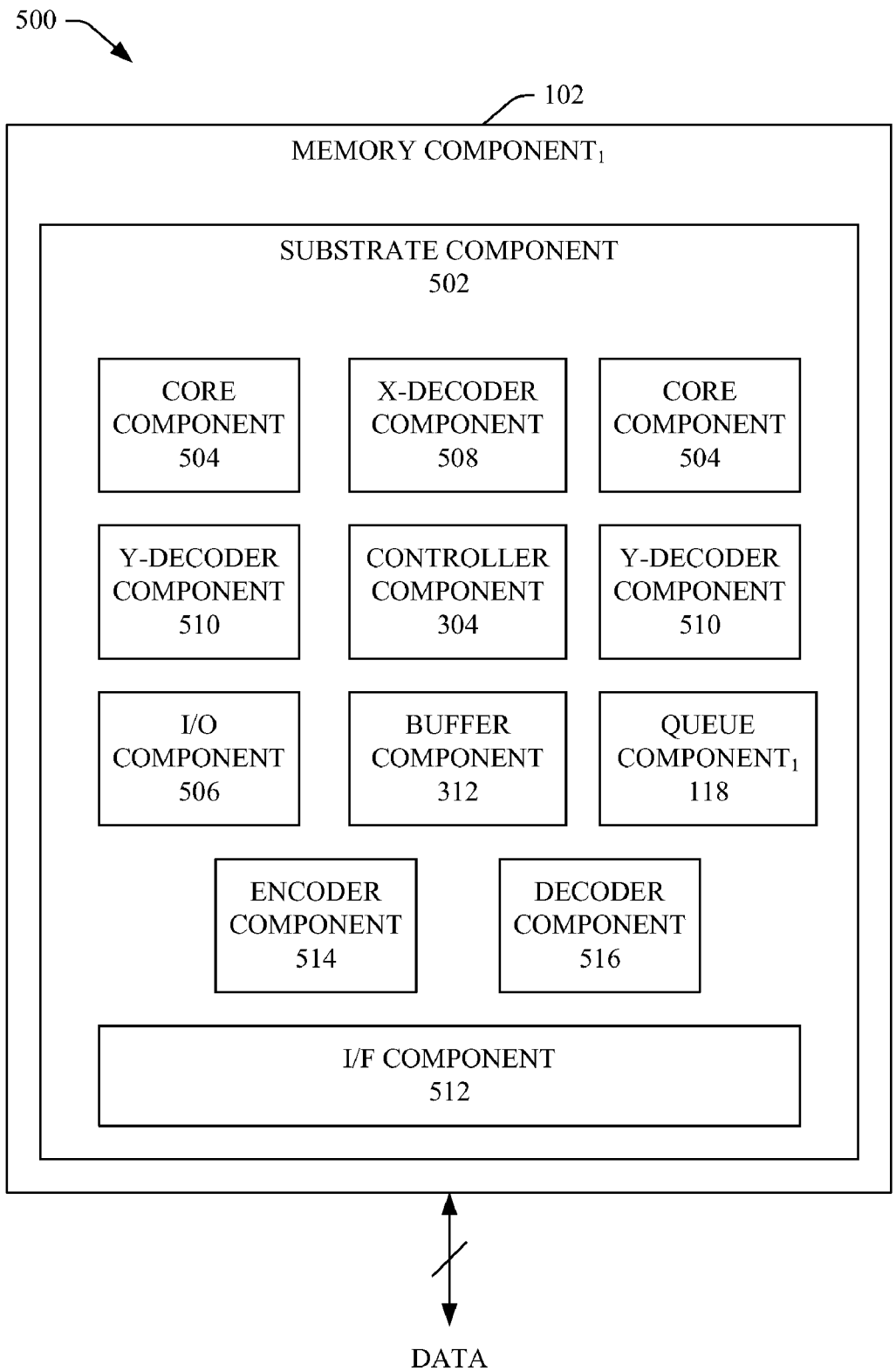
FIG. 5 depicts a block diagram of a system that can facilitate storage and transfer of data in accordance with an aspect of the disclosed subject matter.

When a particular memory component (e.g., 102, 104, 106) has retrieved and loaded data in its respective buffer component (e.g., as illustrated in FIG. 5 and described herein), such memory component can provide a signal to the transfer controller component 114 that such memory component has data ready for transfer, and the transfer controller component 114 can receive the data from such memory component, even if other memory components have not completed servicing their respective commands (e.g., first command). The transfer controller component 114 can store the received data in a specified area of the transfer buffer component 116 based in part on the information in the transfer map, which can contain information identifying the memory component from which the data was received, the LBA and/or PBA from which the data was retrieved, and/or other information, to facilitate proper ordering of the transferred data stored in the transfer buffer component 116.

In accordance with another aspect, the particular memory component can review its queue component (e.g., 118, 120, 122), and if there is another command, the memory component can begin servicing the next command in its queue component to retrieve and load the data associated with the next command. This next command can be serviced by the particular memory component even if the other memory components are still servicing their respective current commands (e.g., first command). Potentially, the particular memory component can retrieve and load the data associated with the next command prior to the other memory components completing service of their respective service commands. In such instance, the loaded data associated with the next command can be transferred to the transfer controller component 114 to be stored in the transfer buffer component 116 in the proper order in relation to other portions of the desired data based in part on the transfer map. Further, the particular memory component can review its queue component to determine whether there is another command in the queue component to service, and can service the next command in the queue component, if any. In one aspect, in the event the transfer buffer component 116 does not have enough space available for a particular transfer, the data can remain in the buffer component of the memory component until the transfer component 116 has available space.

When the memory components 102, 104, 106 have serviced all commands associated with the desired data, and all of the data has been transferred to the transfer controller component 114, the transfer controller component 114 can have the data in the transfer buffer component 116 arranged in a proper order based in part on the transfer map. The transfer controller component 114 can provide the data as an output, for example, to a processor component (e.g., illustrated in FIG. 3 and described herein).

The subject innovation can facilitate improving system performance related to data transfers, as compared to conventional systems for data transfer. For example, the subject innovation can facilitate reducing the amount of time to transfer data between a memory component(s) and a processor component, particularly when there are multiple memory components associated with the processor component, when compared to conventional data transfer systems, as, for instance, the memory components can perform one or more loads and transfers of pieces of data (e.g., by servicing one or more commands in its queue component) independent of the other memory components and/or without regard to the order of the data when the memory component is transferring a particular piece of data, as the transfer controller component can facilitate placing respective pieces of data in a predefined order as desired by the processor component.

Referring back to the memory components 102, 104, 106, each such memory component 102, 104, 106 can comprise nonvolatile memory that can include, but is not limited to, read-only memory (ROM), flash memory (e.g., single-bit flash memory, multi-bit flash memory), mask-programmed ROM, programmable ROM (PROM), Erasable PROM (EPROM), Ultra Violet (UV)-erase EPROM, one-time programmable ROM, electrically erasable PROM (EEPROM), and/or nonvolatile RAM (e.g., ferroelectric RAM (FeRAM)). In one aspect, a flash memory can be comprised of NAND memory and/or NOR memory, for example. In another aspect, each such memory component 102, 104, 106 can comprise volatile memory that can include, but is not limited to, RAM, static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

It is to be appreciated and understood that, while system 100 is depicted with three memory components, the subject innovation is not so limited, and the subject innovation can contain less than three memory components, three memory components, or more than three memory components, as desired. It is to be further appreciated and understood that, while the transfer controller component 114, and transfer buffer component 116 included therein, is depicted as a stand-alone component, the subject innovation is not so limited, as the transfer controller component 114 and/or the transfer buffer component 116 can be incorporated as part of other components, such as memory component$_1$ 102, memory component$_2$ 104, and/or memory component$_n$ 106, and/or other components (e.g., processor component).

For example, in accordance with one embodiment of the disclosed subject matter, there can be multiple transfer buffer components to facilitate a de-centralized data transfer system. Each memory component (e.g., 102, 104, 106) can include its own transfer buffer component (not shown), in addition to the transfer buffer component 116 of the transfer controller component 114. Each memory component can service the commands in its queue component (independent of the other memory components) and can load the retrieved data in its respective transfer buffer component, and can transfer the data in its transfer buffer component to the transfer buffer component 114, for instance, as desired by the transfer controller component, which can arrange the received data in accordance with a predefined order, such as specified in the transfer map. By de-centralizing the transfer buffer components, communication between the memory components and the transfer controller component via the bus can be reduced, as, for example, there can be communication regarding the data transfer when all data stored in a respective memory component is loaded in its transfer buffer, instead of the memory component communicating with the transfer controller component to transfer each piece of data associated with each respective command in a piecemeal manner. By reducing communication via the bus, the bus can have more availability for other functions (e.g., other communications).

It is to be appreciated and understood that, while the queue components (e.g., queue component$_1$ 118, queue component$_2$ 120, queue component$_n$ 122) of the respective memory components (e.g., memory component$_1$ 102, memory component$_n$ 104, memory component$_n$ 106) are depicted as residing within the respective memory components, the subject innovation is not so limited, as in other embodiments, the queue components 118, 120, 122 can be within a stand-alone component that is situated outside of the memory components 102, 104, 106, or the queue components 118, 120, 122 can reside within the transfer controller component 114.

Figure 1B:
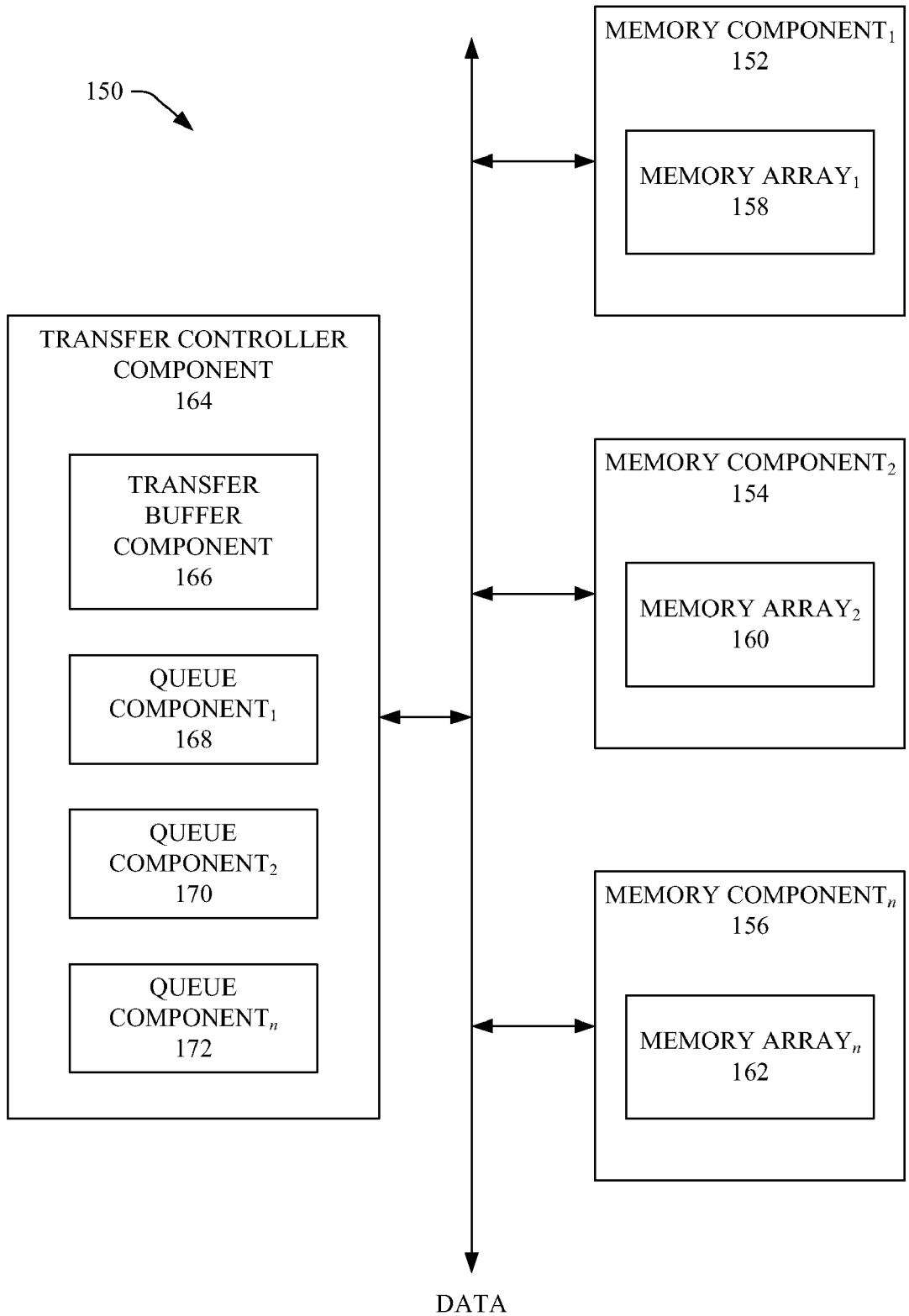
FIG. 1B illustrates a block diagram of a system that can facilitate transfers of data associated with memory components in accordance with another embodiment of the disclosed subject matter.

Referring to FIG. 1B, depicted is a system 150 that can facilitate data transfers associated with memory components in accordance with another embodiment of the disclosed subject matter. System 150 can include a plurality of memory components, such as memory component$_1$ 152, memory component$_2$ 154, and up through memory component$_n$ 156, where n can be virtually any integer number. Each memory component 152, 154, 156 can be comprised of non-volatile memory (e.g., flash memory) and/or volatile memory (e.g., random access memory (RAM)). Each memory component 152, 154, 156 can receive information, including data, commands, and/or other information, which each such memory component 152, 154, 156 can process (e.g., store data, execute commands, etc.). Each memory component 152, 154, 156 can include a respective memory array(s), such as memory array$_1$ 158, memory array$_2$ 160, and up through memory array$_n$ 162. Each memory array 158, 160, 162 can receive and store data and can respectively contain a plurality of memory cells (not shown in FIG. 1B; as depicted in FIG. 6) wherein each memory cell can store one or more bits of data. Data stored in a memory cell(s) in a respective memory array 158, 160, 162 can be read from such memory cell(s) and such data can be provided as an output, or can be erased from the memory cell(s).

In accordance with an aspect of the disclosed subject matter, the system 150 can contain a transfer controller component 164 that can facilitate transfers of data from the respective memory components 152, 154, 156 such that data retrieved and loaded by a particular memory component can be transferred to the transfer controller component 164 where such data can be stored in a respective location (e.g., in a predefined order based in part on a transfer map) in a transfer buffer component 166 within the transfer controller component 164.

In one aspect, the transfer controller component 164 can contain a plurality of queue components, such as queue component$_1$ 168, queue component$_2$ 170, and up through queue component$_n$ 172, where n can be virtually any integer number, that can be respectively associated with memory component$_1$ 152, memory component$_2$ 154, and up through memory component$_n$ 156. In one aspect, the respective queue components 168, 170, 172 each can store the subsets of commands respectively associated with the respective memory components 152, 154, 156.

In accordance with another aspect, the queue components 168, 170, 172 can be managed by the transfer controller component 164. A processor component (e.g., processor component 302, illustrated in FIG. 3 and described herein) can facilitate generating commands associated with respective memory components 152, 154, 156 and the processor component in conjunction with the transfer controller component 164 can facilitate distributing the commands to the respective queue components 168, 170, 172 based in part on the transfer map.

The transfer controller component 164 can facilitate controlling transmission of the commands in the respective queue components 168, 170, 172 to the respective memory components 152, 154, 156. In one aspect, a particular memory component (e.g., 154) can service a command from its queue component (e.g., 170), and after the command is serviced, the particular memory component can indicate to the transfer controller component 164 that the memory component is ready to provide the subset of data associated with that command. The subset of data can be transferred to the transfer buffer component 166. The transfer controller component 164 can review the queue component (e.g., 170) associated with that memory component (e.g., 154) to determine whether there is another command in that queue component. If there is another command in that queue component, the transfer controller component 164 can retrieve the next command in the queue component (e.g., 170) and can facilitate transmission of the next command to that particular memory component (e.g., 154).

The overall functionality of system 150 can be similar to the functionality of system 100, except that the queue components 168, 170, 172 can reside within the transfer controller component 164, where the transfer controller component 164 can facilitate controlling the monitoring of the queue components 168, 170, 172 as well as retrieving the commands from the queue components 168, 170, 172 and transmitting the commands to the appropriate memory components 152, 154, 156. For instance, each memory component 152, 154, 156 can service its respective commands in a parallel and/or an interleaved manner, and, when a memory component (e.g., 154) finishes servicing a command, the memory component (e.g., 154) does not have to wait for the other memory components (e.g., 152) to finish servicing their commands before the memory component (e.g., 154) receives and services its next command. The transfer controller component 164 can store the received subsets of data in a predefined order in the transfer buffer component 166 based in part on a transfer map associated with the commands. The stored data can be transferred to a processor component and/or other component based in part on the commands.

Referring again to the memory components 152, 154, 156, each such memory component 152, 154, 156 can comprise nonvolatile memory that can include, but is not limited to, read-only memory (ROM), flash memory (e.g., single-bit flash memory, multi-bit flash memory), mask-programmed ROM, programmable ROM (PROM), Erasable PROM (EPROM), Ultra Violet (UV)-erase EPROM, one-time programmable ROM, electrically erasable PROM (EEPROM), and/or nonvolatile RAM (e.g., ferroelectric RAM (FeRAM)). In one aspect, a flash memory can be comprised of NAND memory and/or NOR memory, for example. In another aspect, each such memory component 152, 154, 156 can comprise volatile memory that can include, but is not limited to, RAM, static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Figure 2:
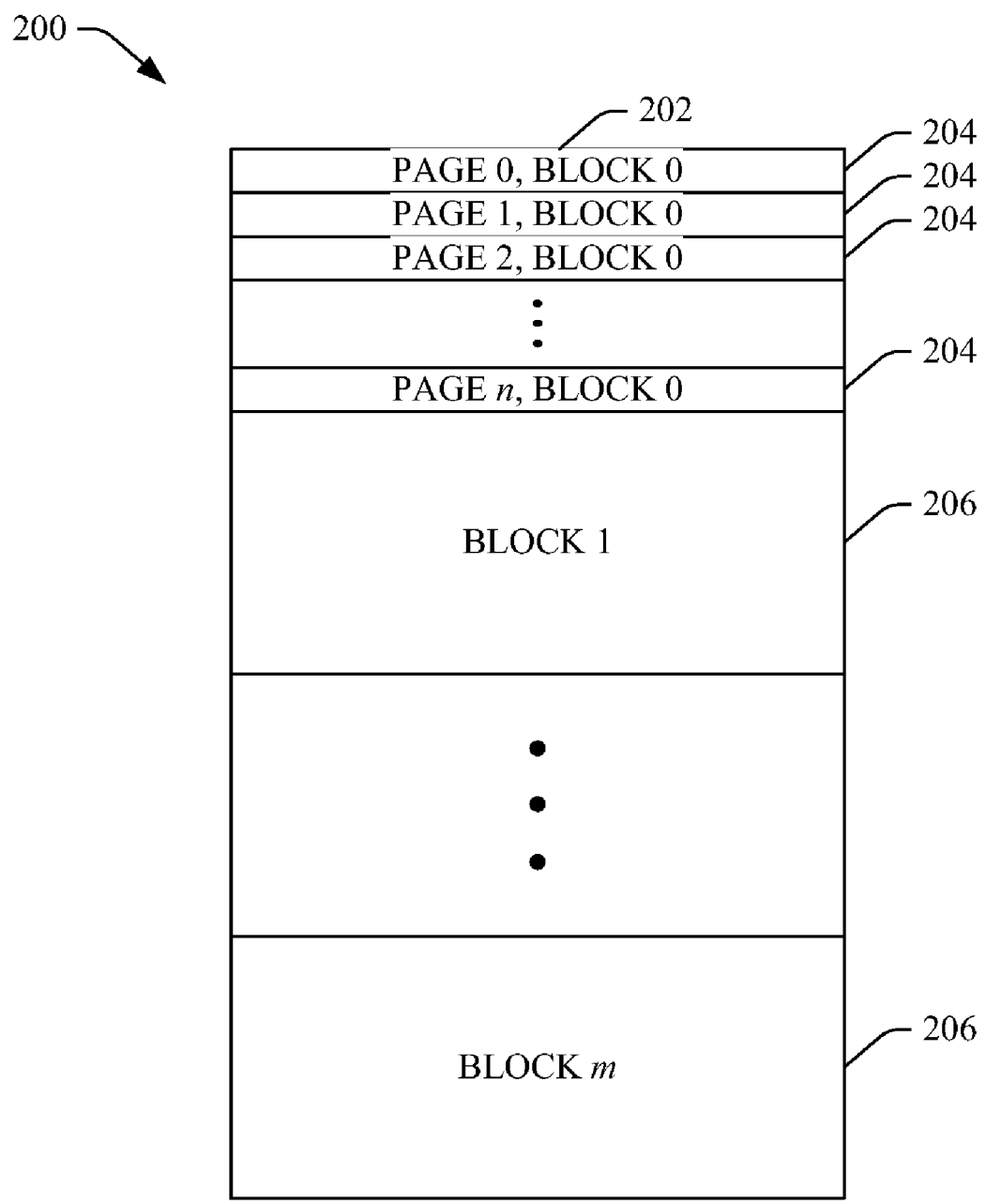
FIG. 2 depicts an example of a block diagram of a portion of a memory component in accordance with an aspect of the disclosed subject matter.

Turning to FIG. 2, depicted is a block diagram of a portion of a memory 200 that can facilitate storage of data in accordance with an aspect of the disclosed subject matter. The memory 200 can be comprised of a memory array 202 that can contain a plurality of pages 204 that can be comprised of and/or associated with memory cells (not shown) in which data can be stored. Each page 204 can store a predetermined number of bits of data. Each page 204 can include a portion of the page 204 that can store data, such as user data, and a portion of the page 204 can store spare data, such as metadata, wherein, for example, the metadata can include a data pattern that can facilitate identifying an LBA and/or associated memory location (e.g., PBA) and/or associated data stored in the PBA contained in a particular page 204.

The memory array 202 can also contain a predetermined number of blocks 206 wherein each block 206 can contain a predetermined number of pages 204. For example, in one embodiment, there can be 512 pages 204 per block 206. In one aspect, the memory 200 can be a respective portion of, can be the same or similar as, and/or can include the same or similar functionality as, memory component$_1$ 102, memory component$_2$ 104, or memory component$_n$ 106 (e.g., as described herein, for example, with regard to system 100) and/or memory component$_1$ 152, memory component$_2$ 154, or memory component$_n$ 156 (e.g., as described herein, for example, with regard to system 150). For example, memory array$_1$ 108, memory array$_2$ 110, and/or memory array$_n$ 112 (e.g., illustrated in FIG. 1A and described herein) and memory array$_1$ 158, memory array$_2$ 160, and/or memory array$_n$ 162 (e.g., illustrated in FIG. 1B and described herein) each can be and/or can comprise, and/or can contain the same or similar functionality as, the memory array 202. In another aspect the memory 200 can comprise a nonvolatile memory (e.g., single-bit flash memory, multi-bit flash memory).

Figure 3:
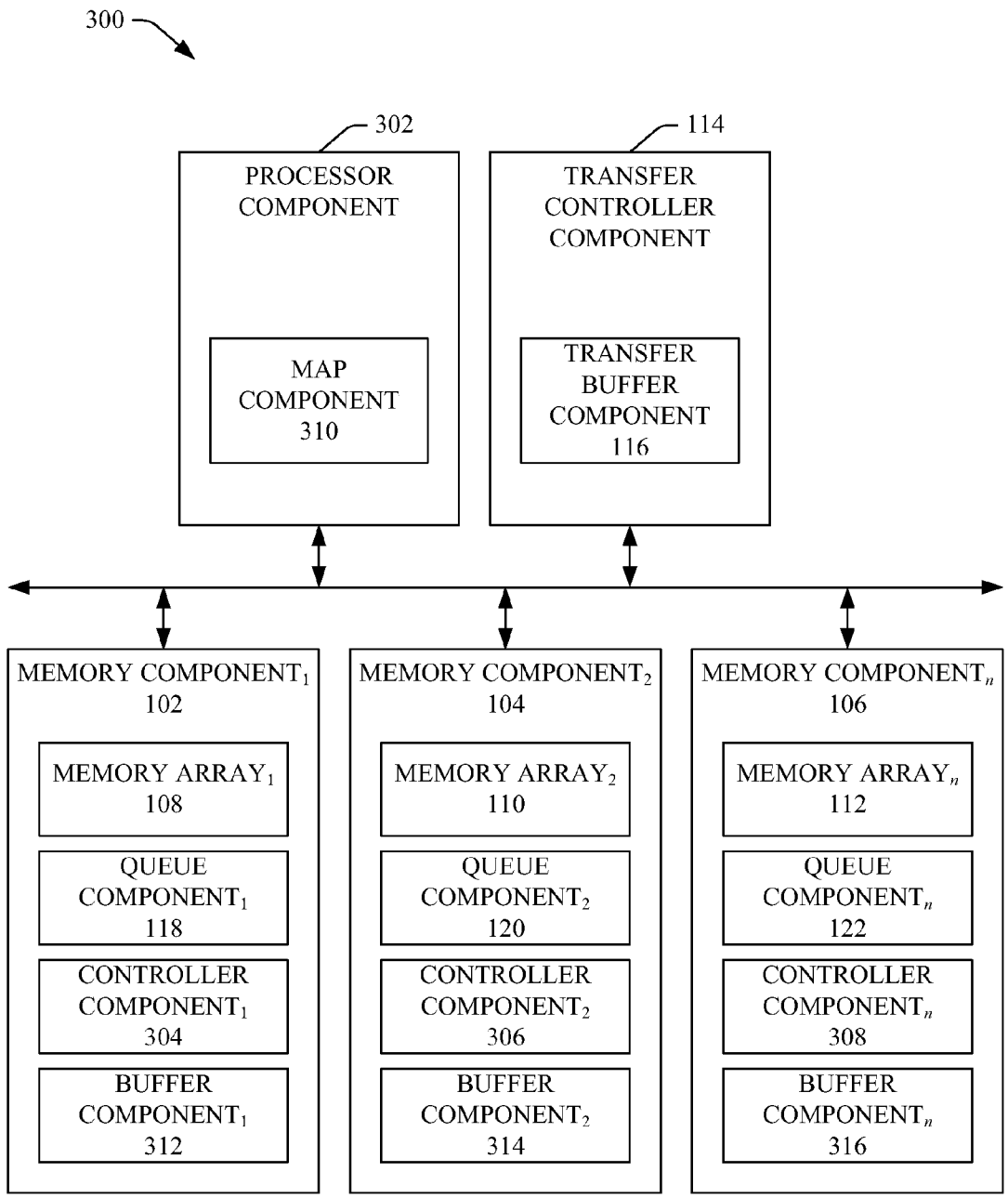
FIG. 3 is a block diagram depicting a system that can facilitate transfers of data associated with memory components in accordance with an aspect of the subject matter disclosed herein.

Turning to FIG. 3, depicted is a diagram of a system 300 that can facilitate transfers of data associated with one or more memory components in accordance with an aspect of the disclosed subject matter. System 300 can include a predefined number of memory components, such as memory component$_1$ 102, memory component$_2$ 104, and up through memory component$_n$ 106, where n can be virtually any integer number. Each memory component 102, 104, 106 can respectively comprise non-volatile memory (e.g., flash memory) and/or volatile memory (e.g., random access memory (RAM)). Each memory component 102, 104, 106 can receive information, including data, commands, and/or other information, which each such memory component 102, 104, 106 can process (e.g., store data, execute commands, etc.). Each memory component 102, 104, 106 can include a respective memory array$_1$ 108, memory array$_2$ 10, and up through memory array$_n$ 112 that can receive and store data. Each memory array 108, 110, 112 can contain a plurality of memory cells (e.g., as illustrated in FIG. 6 and described herein) wherein each memory cell can store one or more bits of data. Data stored in a memory cell(s) in a respective memory array can be read and such data can be provided as an output, or can be erased from the memory cell(s).

In one aspect, each memory component 102, 104, 106 can also comprise a respective queue component, such as queue component$_1$ 118, queue component$_2$ 120, and up through queue component$_n$ 122, that can receive and store multiple commands, such as load and transfer commands, that can be executed and/or serviced by the respective memory components 102, 104, 106.

In another aspect, each memory component 102, 104, 106 can be associated with a transfer controller component 114 via a bus. The transfer controller component 114 can facilitate maintaining the proper order of data (e.g., re-ordering data) transferred from memory components 102, 104, 106 if and when data is transferred from the memory components 102, 104, 106 out of order (e.g., a down line memory component, such as memory component$_2$ 104, completes a load and transfer of data prior to an up line memory component, such as memory component₁ 102, completing a load and transfer of data). The transfer controller component 114 can comprise a transfer buffer component 116 that can store data transferred from the memory components 102, 104, 106 to the transfer controller component 114, wherein such data can be placed in the proper order in the transfer buffer component 116.

The memory components 102, 104, 106, the memory arrays 108, 110, 112, the transfer controller component 114, the transfer buffer component 116, and the queue components 118, 120, 122, each can be the same or similar as, and/or each can contain the same or similar functionality as, respective components as more fully described herein, for example, with regard to system 100 and/or memory 200.

System 300 can include a processor component 302 that can be associated with the memory components 102, 104, 106 and the transfer controller component 114 via the bus. In accordance with an embodiment of the disclosed subject matter, the processor component 302 can be a typical applications processor that can manage communications and run applications. For example, the processor component 302 can be a processor that can be utilized by a computer, mobile handset, personal data assistant (PDA), or other electronic device. The processor component 302 can generate commands, including read, write, and/or erase commands, in order to facilitate reading data from, writing data to, and/or erasing data from the memory component 102.

The communication of information between the processor component 302 and the memory component 102 can be facilitated via a bus that can be comprised of any of several types of bus structure(s) including, but not limited to, a peripheral bus or external bus, and/or a local bus using any variety of available bus architectures including, but not limited to, Open NAND Flash Interface (ONFI), Compact Flash Interface, Multimedia Card (MMC), Secure Digital (SD), CE-ATA, Intelligent Drive Electronics (IDE), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

In one aspect, the processor component 302 can generate a command(s) to perform an operation (e.g., write, read, verify, erase) on a memory location in a memory array (e.g., 108, 110, 112). To facilitate accessing a memory location in a memory component(s) (e.g., 102, 104, 106), the processor component 302 can generate search commands that can be communicated to memory components associated therewith, such as memory component₁ 102, memory component₂ 104, and/or memory componentₙ 106, that can contain the LBAs and/or associated data desired by the processor component 302. Each memory component (e.g., 102, 104, 106) can receive the search command(s) that are directed to such respective memory component. Each memory component can perform a search of its memory array (e.g., 108, 110, 112) to locate the LBAs specified by the search command(s) and stored therein.

In accordance with one aspect, each memory component, including memory component₁ 102, memory component₂ 104, and/or memory componentₙ 106, can contain a controller component, such as controller component₁ 304, controller component₂ 306, and controller componentₙ 308, respectively, that can facilitate performance of the LBA searches. Each controller component 304, 306, 308 can facilitate control of the flow of data to and from its respective memory component 102, 104, 106. In an aspect, a controller component, by itself or in conjunction with the processor component 302, can facilitate execution of operations (e.g., read, write, verify, erase) associated with memory locations in its associated memory array (e.g., 108, 110, 112). In another aspect, the controller component (e.g., 304) can facilitate verifying and/or maintaining the desired charge level(s) associated with data stored in the memory locations in it associated memory array. Each controller component 304, 306, 308 can also facilitate providing information to the processor component 302 regarding the search of its respective memory array 108, 110, 112, such as information indicating that a search is complete, information regarding a location of a desired LBA in its respective memory array, information regarding a terminated search because the desired LBA has not been located within a predetermined number of searches, and/or other information. For example, a controller component (e.g., 304) can search its memory array (e.g., 108) to locate LBAs specified in a search command from the processor component 302, and can provide the search results (e.g., information regarding where the LBAs are physically located, such as block number and/or page number in the memory array) to the processor component 302. In another aspect, each controller component 304, 306, 308 can provide information to the transfer controller component 114 related to data transfers, such as for example, an indication that data is loaded and ready for transfer to the transfer controller component 114

In accordance with an aspect, the processor component 302 can comprise a map component 310 that can be utilized to generate transfer maps to facilitate data transfers from the memory components 102, 104, 106 to the processor component 302. Based in part on the search results received from the memory components 102, 104, 106, the processor component can generate transfer maps. A transfer map can include information such as information specifying the LBAs associated with the desired data, the memory component that a particular LBA, the physical location (e.g., page number, block number in the memory array), associated with a particular LBA, where the desired data, or portion thereof, is located, and/or other information that can facilitate data transfers from the memory components 102, 104, 106 to the processor component via the transfer controller component 114.

In accordance with an aspect of the disclosed subject matter, the processor component 302 can provide a transfer map (s) to the transfer controller component 114, which can utilize the transfer map to facilitate placing the data transfers in proper order after receiving the data transferred from the memory components 102, 104, 106, even though the data potentially can be received by the transfer controller component 114 out of order, so that the data can be provided as an output from the transfer controller component 114 to the processor component 302 in the desired predefined order. In one aspect, the transfer controller component 114 can analyze and evaluate the information in the transfer map and can compare the received data from the memory components 102, 104, 106 to the information in the transfer map to determine the proper order of the data received from the memory components 102, 104, 106.

In accordance with another aspect, based in part on the search results from each memory component 102, 104, 106, the processor component 302 can generate a series of load and transfer commands. Each command of the series of load and transfer commands can contain information specifying the particular memory component to which the command is directed, the LBAs, the physical location (e.g. PBAs) to be accessed (e.g., to read data), and/or other information. The processor component 302 can provide the load and transfer commands to each memory component 102, 104, 106 based in part on the memory component identified in each command. The respective commands can be received by the respective memory components 102, 104, 106, which can store the commands in their respective queue components, 118, 120, 122.

The controller components 304, 306, 308 of each memory component 102, 104, 106 can begin servicing the first command contained in their respective queue components 118, 120, 122. For each command, the desired physical location, as specified in the command, can be accessed and the data (e.g., page) can be retrieved and loaded into a respective buffer component, such as buffer component$_1$ 312, buffer component$_2$ 314, and buffer component$_n$ 316 that can be internal to the respective memory components 102, 104, 106.

When a particular memory component (e.g., 102, 104, 106) has retrieved and loaded data in its respective buffer component (e.g., 312, 314, 316), the respective controller component (e.g., 304, 306, 308) can provide a signal to the transfer controller component 114 that such memory component has data ready for transfer, and the transfer controller component 114 can receive the data from such memory component, even if other memory components have not completed servicing their respective commands (e.g., first command). The transfer controller component 114 can store the received data in a specified area of the transfer buffer component 116 based in part on the information in the transfer map to facilitate proper ordering of the transferred data stored in the transfer buffer component 116.

In accordance with another aspect, the particular memory component can begin servicing the next command in its queue component (e.g., 118, 120, 122) to retrieve and load the data associated with the next command. This next command can be serviced by the particular memory component even if the other memory components are still servicing their respective current commands (e.g., first command). Each memory component 102, 104, 106 can execute operations associated with the commands in their respective queue components 118, 120, 122 and can transfer data to the transfer controller component 114 independent of the other memory components, so long as the transfer buffer component 116 has available space to store the data transfers. If the transfer buffer component 116 does not have enough available space to receive a data transfer out of order, the data waiting to be transferred can reside in the particular buffer component (e.g., 312, 314, 316) until the transfer buffer component 116 has available space (e.g., the transfer buffer component 116 transfers data stored therein to the processor component 302).

When the memory components 102, 104, 106 have serviced all commands associated with the desired data, and all of the data has been transferred to the transfer controller component 114, the transfer controller component 114 can have the data in the transfer buffer component 116 in a predefined order based in part on the transfer map. The transfer controller component 114 can provide the data as an output to the processor component 302.

To illustrate with a non-limiting example of data transfers associated with memory components 102, 104, 106, the processor component 302 can generate search commands for data striped across the memory components 102, 104, 106 such that each memory component 102, 104, 106 has a portion of the desired data stored therein. For instance, the processor component 302 can desire data associated with LBAs 20 through 47. The LBAs and associated data can be distributed in the memory components 102, 104, 106 such that memory component$_1$ 102 can contain LBAs 20-23, 32-35, and 44-47. Memory component$_2$ 104 can contain LBAs 24-27 and 36-39. Memory component$_n$ 106 can contain LBAs 28-31 and 40-43.

The processor component 302 can issue a search command specifying that memory component$_1$ 102 is to search for LBAs 20-23, 32-35, and 44-47 in its memory array$_1$ 108. The processor component 302 can issue another search command specifying that memory component$_2$ 104 is to search for LBAs 24-27 and 36-39 in its memory array$_2$ 110. The processor component 302 can issue still another search command specifying that memory component$_n$ 106 is to search for LBAs 28-31 and 40-43 in its memory array$_n$ 112. Each memory component 102, 104, 106 can receive their respective search command, the controller components 304, 306, 308 can facilitate searching their respective memory arrays 108, 110, 112 based in part on the respective search command. In one aspect, each memory component 102, 104, 106 can perform its memory search independent of the other memory components, and can perform the memory searches in an interleaved manner and/or in parallel such that the memory components 102, 104, 106 are performing their respective memory searches at the same or substantially the same time.

Each memory component 102, 104, 106 can determine the physical locations (e.g., block number, page number) in the respective memory arrays 108, 110, 112 associated with the LBAs specified in the respective search commands and can provide an indication to the processor component 302 when its search is complete. Each memory component 102, 104, 106 can provide its search results to the processor component 302. For instance, memory component$_1$ 102 can search its memory array$_1$ 108 and can determine that LBAs 20-23 are associated with or stored in block 10, page 23 in memory array$_1$ 108; LBAs 32-35 are associated with or stored in block 12, page 45 in memory array$_1$ 108; and LBAs 44-47 are associated with or stored in block 9, page 34 in memory array$_1$ 108. Also, memory component$_2$ 104 can search its memory array$_2$ 110 and can determine that LBAs 24-27 are associated with or stored in block 6, page 56 in memory array$_2$ 110; and LBAs 36-39 are associated with or stored in block 8, page 3 in memory array$_2$ 110. Further, memory components 106 can search its memory array$_n$ 112 and can determine that LBAs 28-31 are associated with or stored in block 16, page 15 in memory array$_n$ 112; and LBAs 40-43 are associated with or stored in block 20, page 19 in memory array$_n$ 112.

The processor component 302 can employ the map component 310 to generate a transfer map based in part on the search results. For example, the map component can generate the following transfer map:

| LBAs | TRANSFER MAP |
| --- | --- |
| LBAs 20-23 | Memory Component$_1$, block 10, page 23 |
| LBAs 24-27 | Memory Component$_2$, block 6, page 56 |
| LBAs 28-31 | Memory Component$_n$, block 16, page 15 |
| LBAs 32-35 | Memory Component$_1$, block 12, page 45 |
| LBAs 36-39 | Memory Component$_2$, block 8, page 3 |
| LBAs 40-43 | Memory Component$_n$, block 20, page 19 |
| LBAs 44-47 | Memory Component$_1$, block 9, page 34 |

The transfer map can be provided to the transfer controller component 114 and can be stored therein to facilitate maintaining the data transferred from the memory components 102, 104, 106, even if the respective portions of the desired data are not provided to the transfer controller component 114 in order, as depicted in the transfer map. That is, for example, if the transfer controller component 114 receives the data associated with LBAs 24-27 before it receives the data associated with LBAs 20-23, the transfer controller component 114 can place and/or rearrange the data in the proper order in the transfer buffer component 116 based in part on the transfer map. The transfer controller component 114 can analyze and evaluate the information in the transfer map and can compare the received data to the information in the transfer map to determine the proper order of the data received from the memory components 102, 104, 106.

Based in part on the search result information, the processor component 302 also can generate load and transfer commands that can be provided to the memory components 102, 104, 106 so that the desired data can be retrieved, loaded, and transferred from the memory components 102, 104, 106. For instance, the processor component 302 can generate and provide the following commands:

| Memory component$_1$ 102 | Memory component$_2$ 104 | Memory component$_n$ 106 |
|---|---|---|
| Load and transfer block 10, page 23 | Load and transfer block 6, page 56 | Load and transfer block 16, page 15 |
| Load and transfer block 12, page 45 | Load and transfer block 8, page 3 | Load and transfer block 20, page 19 |
| Load and transfer block 9, page 34 | Unused bandwidth | Unused bandwidth |

Memory components 102, 104, 106 can receive their respective commands, which can be placed in the respective queue components 118, 120, 122. Each memory component 102, 104, 106 can proceed to service the first command in its respective queue component 118, 120, 122. Thus, for example, memory component$_1$ 102 can service the command to load and transfer block 10, page 23 in its memory array$_1$ 108; memory component$_2$ 104 can service the command to load and transfer block 6, page 256 in its memory array$_2$ 110; and memory component$_n$ 106 can service the command to load and transfer block 16, page 15 in its memory array$_n$ 112.

As each memory component 102, 104, 106 retrieves the desired portions (e.g., subsets) of data, memory component$_2$ 104, for instance, can finish retrieving the data associated with the first command and can load the data in its buffer component$_2$ 314 before memory component$_1$ 102 finishes servicing its first command and memory component$_n$ 106 finishes servicing its first command. The controller component$_2$ 306 can indicate to the transfer controller component 114 that it has data ready for transfer. The transfer controller component 114 can receive the data associated with the first command, and can review the transfer map to determine in what position the received data should be placed, and can place the received data in its proper place in the transfer buffer component 116 based in part on the transfer map. Controller component$_2$ 306 can review its queue component$_2$ 120 to determine whether there is another command in the queue component$_2$ 120, where controller component$_2$ 306 can determine that there is another command in its queue component$_2$ 120. Controller component$_2$ 306 can retrieve and service its next command to load and transfer block 8, page 3, even though memory component$_1$ 102 and memory component$_n$ 106 have not completed their first commands.

Memory component$_1$ 102 can complete its first command, can load the data in buffer component$_1$ 312, and can indicate to the transfer controller component 114 that there is data ready for transfer. The transfer controller component 114 can receive the data from memory component$_1$ 102, can review the transfer map and can place the data in the proper order with respect to the other received data (e.g., the data previously received from memory component$_2$ 104), so that the data is in an order that corresponds to the transfer map. Controller component$_1$ 304 can review its queue component$_1$ 118 to determine whether there is another command in the queue component$_1$ 118, where controller component$_1$ 304 can determine that there is another command in its queue component$_1$ 118. Controller component$_1$ 304 can retrieve and service the next command to load and transfer block 12, page 45, even though memory component$_n$ 106 has not completed its first command.

At some point in time, memory component$_n$ 106 can complete its load and transfer of the data associated with block 16, page 15, can load the data into buffer component$_n$ 316, can indicate to the transfer controller component 114 that is has data ready for transfer, and such data can be transferred to the transfer controller component 114, where the transfer controller component 114 can place such data in the proper place (e.g., order) in the transfer buffer component 116 based in part on the transfer map. Controller component$_n$ 308 can review its queue component$_n$ 122 to determine whether there is another command in the queue component$_n$ 122, where controller component$_n$ 308 can determine that there is another command in its queue component$_n$ 122. Controller component$_n$ 308 can retrieve and service the next command to load and transfer block 20, page 19.

The data transfers can proceed until all the desired data (e.g., data associated with LBAs 20-47) is transferred to the transfer buffer component 116. The transfer controller component 114 can provide an indication (e.g., signal) to the processor component 302 that the data is retrieved and ready for transfer, and the data can be transferred from the transfer buffer component 116 to the processor component 302, where the data can be provided in the proper order, from LBA 20 through LBA 47.

The subject innovation can facilitate improving system performance, such as system performance associated with data transfers, as compared to conventional systems for data transfer. The subject innovation can facilitate reducing the amount of time to transfer data between a memory component(s) and a processor component, particularly when there are multiple memory components associated with the processor component, as compared to conventional data transfer systems, because, for instance, the memory components can perform loads and transfers of pieces of data (e.g., by servicing one or more commands in its queue component) independent of the other memory components and/or without regard to the order of the data when the memory component is transferring a particular piece of data, as the transfer controller component can facilitate placing respective pieces of data in a predefined order as desired by the processor component.

It is to be appreciated and understood that, while system 300 is depicted with three memory components, the subject innovation is not so limited, and the subject innovation can contain less than three memory components, three memory components, or more than three memory components, as desired. It is to be further appreciated and understood that, while the transfer controller component 114, and transfer buffer component 116 included therein, is depicted as a stand-alone component, the subject innovation is not so limited, as the transfer controller component 114 and/or the transfer buffer component 116 can be incorporated as part of other components, such as memory component$_1$ 102, memory component$_2$ 104, and/or memory component$_n$ 106, and/or other components (e.g., processor component 302).

For example, in accordance with one embodiment of the disclosed subject matter, there can be multiple transfer buffer components that can be de-centralized with respect to the transfer controller component 114. Each memory component (e.g., 102, 104, 106) can include its own transfer buffer component (not shown), in addition to the transfer buffer component 116 of the transfer controller component 114. Each memory component can service the commands in its queue component (independent of the other memory components) and can load the retrieved data in its respective transfer buffer component, and can transfer the data in its transfer buffer component to the transfer buffer component 114, for instance, as desired by the transfer controller component, which can arrange the received data in accordance with a predefined order, such as specified in the transfer map. By de-centralizing the transfer buffer components, communication between the memory components and the transfer controller component via the bus can be reduced, as, for example, there can be communication regarding the data transfer when all data stored in a respective memory component is loaded in its transfer buffer, instead of the memory component communicating with the transfer controller component to transfer each piece of data associated with each respective command in a piecemeal manner. By reducing communication via the bus, the bus can have more availability for other functions (e.g., other communications).

It is to be appreciated and understood that, while the queue components (e.g., queue component$_1$ 118, queue component$_2$ 120, queue component$_n$ 122) of the respective memory components (e.g., memory component$_1$ 102, memory component$_2$ 104, memory component$_n$ 106) are depicted as residing within the respective memory components, the subject innovation is not so limited, as in other embodiments, the queue components 118, 120, 122 can be within a stand-alone component that is situated outside of the memory components 102, 104, 106, or the queue components can reside within the transfer controller component (e.g., as illustrated in FIG. 1B and described herein).

For example, in accordance with one embodiment, the queue components 118, 120, 122 can be structured in a stand-alone component, and the queue components 118, 120, 122 can be managed by the transfer controller component 114. The processor component 302 can facilitate generating commands associated with respective memory components 102, 104, 106 and the processor component 302 in conjunction with the transfer controller component 114 can facilitate distributing the commands to the respective queue components 118, 120, 122 based in part on the transfer map.

The transfer controller component 114 can facilitate controlling transmission of the commands in the respective queue components 118, 120, 122 to the respective memory components 102, 104, 106. In one aspect, a particular memory component (e.g., 104) can service a command from its queue component (e.g., 120), which can be in a stand-alone component, and after the command is serviced, the controller component (e.g., 306) of the particular memory component can facilitate indicating to the transfer controller component 114 that the memory component is ready to receive the next command stored in its respective queue component (e.g., 120). The transfer controller component 114 can facilitate transmission of the next command by communicating to the stand-alone component that contains the queue components 118, 120, 122 that the particular memory component (e.g., 102) is ready for the next command in its queue component (e.g., 120), and the next command can be retrieved from the respective queue component (e.g., 120) and provided to the particular memory component (e.g., 104).

Figure 4:
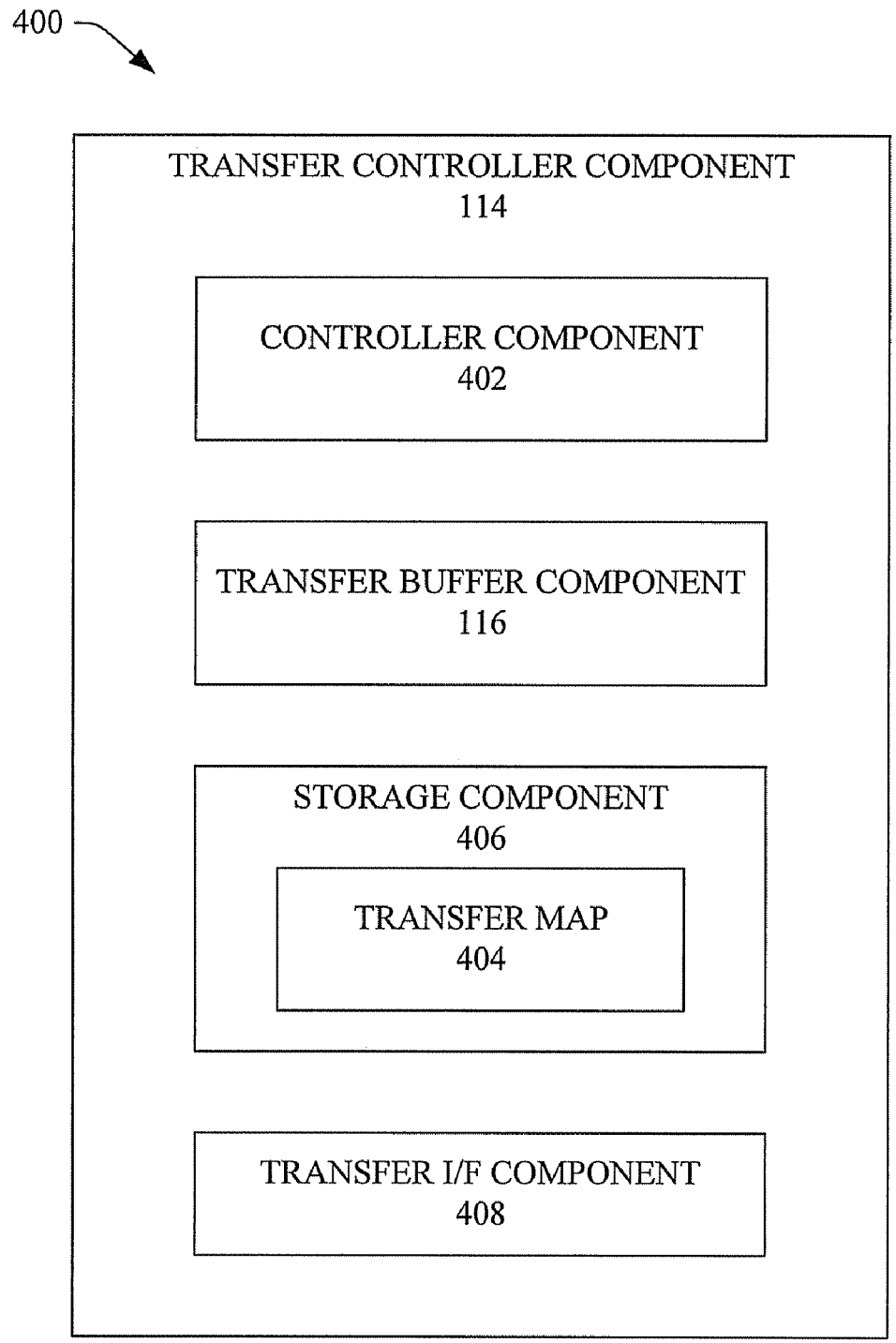
FIG. 4 illustrates a block diagram of a system that employs a transfer controller component to facilitate transfers of data associated with a memory component(s) in accordance with an aspect of the disclosed subject matter.

Referring to FIG. 4, illustrated is a block diagram of a system 400 that can employ a transfer controller component to facilitate transfers of data associated with multiple memory components in accordance with an aspect of the disclosed subject matter. System 400 can include a transfer controller component 114 that can facilitate transferring data between memory components (e.g., 102, 104, 106, as illustrated in FIGS. 1A and 3, and described herein; memory components 152, 154, 156, as illustrated in FIG. 1B and described herein) and a processor component (e.g., 302, as depicted in FIG. 3 and described herein). The transfer controller component 114 can comprise a transfer buffer component 116 that can store data transferred from the memory components, where the transfer controller component 114 can maintain and/or arrange data received from the memory components in a predefined order based in part on a transfer map associated with the data, even if the data is received out of order from the memory components. It is to be appreciated and understood that the transfer memory component 114 and transfer buffer component 116 each can be the same or similar, and/or can contain the same or similar functionality, as respective components, as more fully described herein, for example, with regard to system 100 and/or system 300.

In one aspect, the transfer controller component 114 can include a controller component 402 that can facilitate controlling and/or managing data transfers between the memory components and the processor component. The controller component 402 can receive a transfer map 404 from the processor component and can store the transfer map in the storage component 406. The transfer map can contain information regarding the location of respective portions of the desired data stored in the memory components, and can be utilized to place and/or re-arrange the portions of the desired data in proper order that can correspond to the transfer map, when the data is received from the memory components, even if the portions of desired data are received out of order by the memory components (e.g., a down line memory component transfers data to the transfer controller component 114 before an up line memory component).

The transfer controller component 114 can also comprise a transfer interface component 408 that can include and/or provide various adapters, connectors, channels, communication paths, etc. to integrate the transfer controller component 114 into virtually any operating and/or database system(s) and/or with one another system(s). In addition, the transfer interface component 408 can provide various adapters, connectors, channels, communication paths, etc., that can provide for interaction and/or communication with the processor component 302 (e.g., as depicted in FIG. 3), and/or any other component, data, and the like, associated with the system 400.

With regard to the transfer buffer component 116, in one aspect, the transfer buffer component 116 can have dedicated buffer (e.g., storage) regions wherein data can be stored based in part on a particular transfer map. In accordance with one embodiment, the transfer buffer component 116 can store the received data dynamically in the storage regions of the transfer buffer component 116 and the controller component 402 can facilitate ordering the data according to an associated transfer map. Thus, if a processor component 302 (e.g., as depicted in FIG. 3 and described herein) issues two sets of commands to read data from the memory components (e.g., 102, 104, 106, as illustrated in FIGS. 1 and 3, and described herein), the transfer buffer component 116 can dynamically store the data (as opposed to dedicating data storage for a first set of commands, and dedicating data storage for a second set of commands, etc.) as it is received. The controller component 402 can control the data transfers such that there can be sufficient storage available in the transfer buffer component 116 so that there is enough storage available to store the data associated with at least one of the respective sets of commands.

In accordance with another embodiment, a transfer controller component (e.g., 166) can comprise similar functionality as the transfer controller component 114, and can also contain a plurality of queue components, such as queue component$_1$ 168, queue component$_2$ 170, and up through queue component$_n$ 172 (e.g. as depicted in FIG. 1B and described herein), and can facilitate managing the queue components 168, 170, 172, including monitoring and/or retrieving commands from the queue components 168, 170, 172, for example.

Referring to FIG. 5, depicted is a block diagram of a system 500 that can facilitate access of data in a memory in accordance with an aspect of the disclosed subject matter. System 500 can include a memory component$_1$ 102 that can be comprised of a non-volatile memory (e.g., single-bit flash memory, multi-bit flash memory) and/or volatile memory (e.g., SRAM). For example, the memory component$_1$ 102 can comprise NOR flash memory and/or NAND flash memory. The memory component$_1$ 102 can include a memory array$_1$ 108 (e.g., as illustrated in FIG. 1A and FIG. 3, and described herein) that can be comprised of a plurality of memory cells (e.g., as depicted in FIG. 6), which can be memory locations, wherein, for each memory cell, one or more bits of data can be stored, and from which stored data can be read.

The memory component$_1$ 102 can comprise a controller component$_1$ 304 that can control and/or manage the execution of operations, and/or control data flow, associated with the memory component$_1$ 102. In one aspect, the memory component$_1$ 102 can contain a queue component$_1$ 118 that can store one or more commands to facilitate execution of operations in the memory component$_1$ 102 and data transfers associated with the memory component$_1$ 102. The memory component$_1$ 102 also can include a buffer component$_1$ 312 that can store data retrieved from the memory array$_1$ 108, where the data can reside until transferred from the memory component$_1$ 102, for example, to the transfer controller component 114 (e.g., as depicted in FIGS. 1 and 3, and described herein) and/or processor component 302 (e.g., as depicted in FIG. 3 and described herein). It is to be appreciated that the memory component$_1$ 102, memory array$_1$ 108, queue component$_1$ 118, controller component$_1$ 304, and buffer component$_1$ 312 each can be the same or similar as respective components, and/or can contain the same or similar functionality as respective components, as more fully described herein, for example, with regard to system 100, memory 200, and/or system 300.

In accordance with an aspect, the memory component$_1$ 102, including memory array$_1$ 108, queue component$_1$ 118, controller component$_1$ 304, and buffer component$_1$ 312, and other components described herein, for example, with regard to system 500 can be formed and/or contained on a substrate component 502 (e.g., semiconductor substrate). In another aspect, one or more core components 504 (e.g., high-density core regions) and one or more lower-density peripheral regions can be formed on the substrate component 502. The core component(s) 504 typically can include one or more M by N arrays (e.g., memory array 104) of individually addressable, substantially identical multi-bit memory cells (e.g., as illustrated in FIG. 6 and described herein). The lower-density peripheral regions can typically include an input/output component 506 (e.g., input/output (I/O) circuitry) and programming circuitry for selectively addressing the individual memory cells. The programming circuitry can be represented in part by and can include one or more x-decoder components 508 and one or more y-decoder components 510 that can cooperate with the I/O component 506 for selectively connecting a source (not shown), gate (not shown), and/or drain (not shown) of selected addressed memory cells to predetermined voltages or impedances to effect designated operations (e.g., programming, reading, verifying, erasing) on the respective memory cells, and deriving necessary voltages to effect such operations. For example, an x-decoder component 508 and a y-decoder component 510 can each receive address bus information, which can be provided as part of a command, and such information can be utilized to facilitate determining the desired memory cell(s) in the memory component 102.

The memory component 102 can receive information (e.g., data, commands, etc.) via an interface component 512 (also referred to herein as "I/F 512"), which can also be formed on substrate component 502. I/F 512 can include and/or provide various adapters, connectors, channels, communication paths, etc. to integrate the memory component$_1$ 102 into virtually any operating and/or database system(s) and/or with one another system(s). In addition, I/F 512 can provide various adapters, connectors, channels, communication paths, etc., that can provide for interaction and/or communication with a processor component 302 (e.g., as depicted in FIG. 3 and described herein), and/or any other component, data, and the like, associated with the system 500. In accordance with one aspect, the I/F 512 can be structured based in part on an ONFI standard to facilitate communication of data.

The memory component$_1$ 102 can also contain an encoder component 514 that can facilitate encoding data being programmed to the memory component$_1$ 102, where the encoder component 514 also can be formed on the substrate component 502. For example, the encoder component 514 can facilitate converting a digital signal to an analog signal (e.g., current level) to facilitate programming data in the memory locations (e.g., memory cells) in the memory component 102.

The memory component$_1$ 102 can further include a decoder component 516 that can facilitate decoding data being read from the memory component$_1$ 102. The decoder component 516 can receive an analog signal associated with data, where the analog signal can be stored in the memory location in the memory array$_1$ 108, and can facilitate converting the analog signal to a digital signal, so that such digital signal representing the read data can be provided to another component (e.g., processor component 302) for further processing.

It is to be appreciated and understood that memory component$_2$ 104 and up through memory component$_n$ 106, and their respective components, can be the same or similar as, and/or can contain the same or similar functionality as, memory component$_1$ 102 and its respective components, for example, as described herein with respect to system 100, system 200, system 300, and/or system 500. It is also to be appreciated and understood that memory component$_1$ 152, memory component$_2$ 154 and up through memory component$_n$ 156, and their respective components, can be the same or similar as, and/or can contain the same or similar functionality as, memory component$_1$ 102 and its respective components, for example, as described herein with respect to system 100, system 200, system 300, and/or system 500, except that memory components 152, 154, 156 (e.g., as depicted in FIG. 1B and described herein) do not contain queue components and the queue components 168, 170, 172 (e.g., as depicted in FIG. 1B and described herein) respectively associated with memory components 152, 154, 156 can be contained in the transfer controller component 166 (e.g., as depicted in FIG. 1B and described herein), which can facilitate managing the queue components 168, 170, 172.

Turning to FIG. 6, depicted is an example diagram of a portion of a memory 600 that can be employed to facilitate storage of data in a memory in accordance with an aspect of the disclosed subject matter. The memory 600 can comprise a memory array 602 that can include a plurality of memory cells 604 that each can be comprised of a drain (D), gate, and source (S). Each memory cell 604 can have one or more levels therein and can store one or more bits of data therein. The memory array 602 can be the same or similar to the memory array$_1$ 108, memory array$_2$ 110, and/or memory array$_n$ 112, as more fully described herein, and/or can be included in a memory component, such as memory component$_1$ 102, memory components, 104, and/or memory component$_n$ 106 (e.g., as described herein, for example, with regard to system 100, system 300, etc.), and/or memory component$_1$ 152, memory component$_2$, 154, and/or memory component$_n$ 156 (e.g., as described herein, for example, with regard to system 150).

The memory array 602 can be associated with an x-decoder component 508 (e.g., WL decoder) and a y-decoder component 510 (e.g., BL decoder) that can each respectively decode inputs/outputs during various operations (e.g., programming, reading, verifying, erasing) that can be performed on the memory cells 604. The x-decoder component 508 and y-decoder component 510 can each receive address bus information and/or other information, and can utilize such information to facilitate accessing or selecting the desired memory cell(s) (e.g., memory location(s)) associated with the command. The x-decoder component 508 and y-decoder component 510 each can be the same or similar to respective components, as more fully described herein, and can be included in a memory component$_1$ 102 (as described herein, for example, with regard to system 100, system 300, etc.).

The memory cells 604 can be formed in M rows and N columns. A common WL can be attached to the gate of each memory cell 604 in a row, such as word-lines WL0, WL1, WL2, through WLM. A common BL can be attached to each cell 604 in a column, such as bit-lines BL0, BL1, through BLN. A WL can contain, for example, 1024 elements forming multiple words and a sector of the memory array 602 can include, for example, 512 WLs to provide at least 512 k elements of memory. In accordance with an aspect of the disclosed subject matter, respective voltages can be applied to one or more cells 604 through the WLs and BLs to facilitate performing operations, such as program, read, erase, and the like.

In accordance with one embodiment of the disclosed subject matter, the memory component$_1$ 102, memory component$_2$ 104, memory component$_n$ 106, memory component$_1$ 152, memory component$_2$ 154, memory component$_n$ 156, and/or other respective components (e.g., cryptographic component (not shown), authentication component (not shown), etc.) can be situated or implemented on a single integrated-circuit chip. In accordance with another embodiment, the memory component$_1$ 102, memory component$_2$ 104, and/or memory component$_n$ 106, memory component$_1$ 152, memory component$_2$ 154, memory component$_n$ 156, and/or other respective components can be implemented on an application-specific integrated-circuit (ASIC) chip.

The aforementioned systems have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

FIGS. 7-10 illustrate methodologies and/or flow diagrams in accordance with the disclosed subject matter. For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Figure 7:
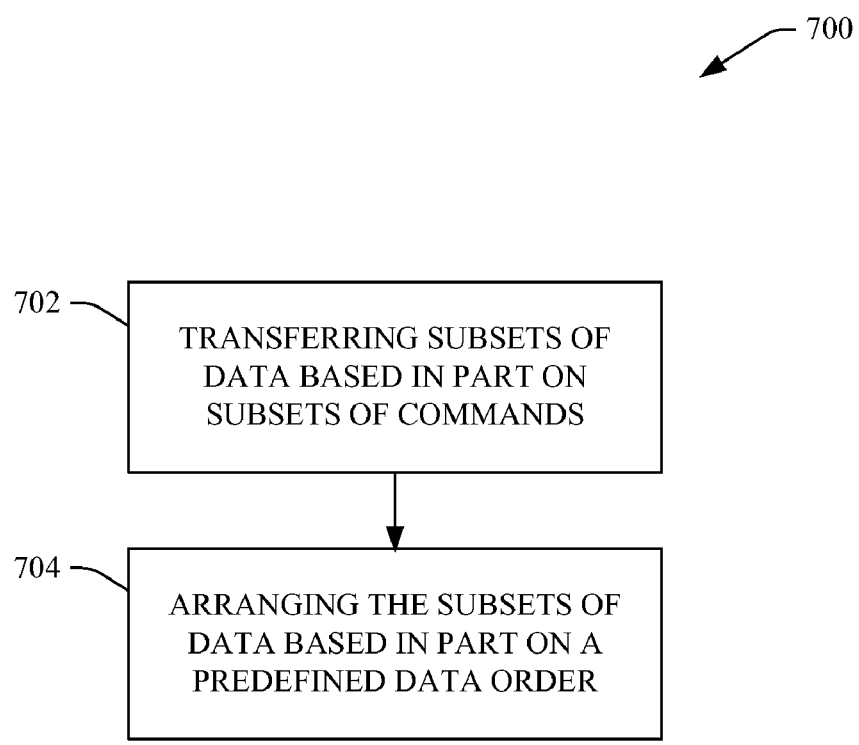
FIG. 7 depicts a methodology that can transfer data associated with memory components in accordance with an aspect of the disclosed subject matter.

Referring to FIG. 7, a methodology 700 that can facilitate accessing data associated with a memory component(s) in accordance with an aspect of the disclosed subject matter is illustrated. At 702, one or more subsets of data can be transferred based in part on one or more subsets of commands. In one aspect, there can be one or more memory components (e.g., 102, 104, 106, 152, 154, 156) associated with a processor component. The processor component (e.g., 302) can generate and provide search commands that include memory component information, information regarding desired LBAs in respective memory components, and/or other information to facilitate searching the respective memory components to locate the physical locations corresponding to the LBAs to facilitate accessing the desired physical locations to perform an operation(s) (e.g., read, write, erase, etc.) thereon. Each memory component can search its memory array (e.g., 108, 110, 112, 158, 160, 162) to locate the desired physical locations and can provide such information to the processor component. The processor component can generate a transfer map (e.g., 404) that can include information, such as the search result information, that can identify the desired LBAs; for each LBA, information that can identify which memory component(s) contains a particular LBA; a physical location in the memory component associated with the particular LBA; and/or other information. In accordance with an aspect, the transfer map can be structured such that respective subsets of data associated with the physical locations, which are retrieved and transferred, can be placed in a desired predefined order utilizing the transfer map.

One or more subsets of commands (e.g., load and transfer commands) can be generated and provided to respective memory components based in part on the search result information and/or the transfer map. Each memory component can receive the subset of commands directed to such memory component and can place the subset of commands in its queue component (e.g., 118, 120, 122, 168, 170, 172). Each memory component can service the commands in its queue, where each command can be associated with a subset of data, to load and transfer the subsets of data to the transfer controller component.

In one aspect, each memory component can operate independent of the other memory components such that, when a memory component completes a load based in part on the command, the memory component does not have to wait for the other memory components to complete their load before it can transfer the loaded data, as such memory component can transfer the loaded data to a transfer buffer component (e.g., 116, 166) and can examine its queue component to determine whether there is another command in its queue component. If there is another command in its queue component, such memory component can service that next command without waiting for the other memory components to finish their respective current commands. Each memory component can load and transfer the respective subsets of data associated with the respective commands, and can transfer such subsets of data to the transfer buffer component associated with the transfer controller component (e.g., 114, 164).

At 704, the one or more subsets of data can be arranged based in part on a predefined data order. In one aspect, the transfer controller component can arrange the respective subsets of data received from the memory components into a predefined order for the data. In accordance with an aspect, the predefined data order can be based in part on the information in the transfer map, which can be structured so that the subsets of data are arranged in a predefined order, as desired by the processor component. At this point, methodology 700 can end.

Figure 8:
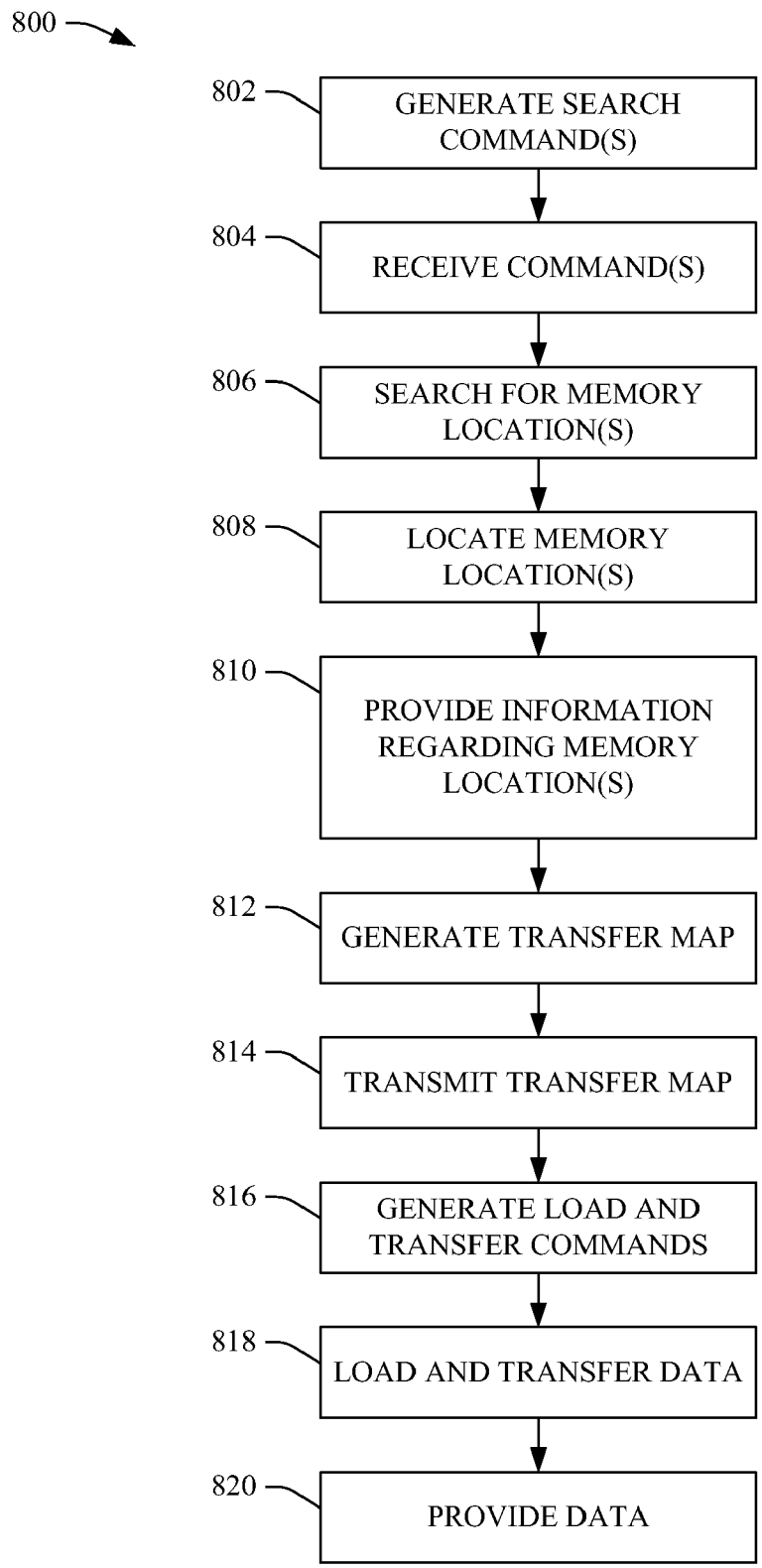
FIG. 8 illustrates a methodology that can generate a transfer map to facilitate accessing data associated with memory components in accordance with an aspect of the disclosed subject matter.

Turning to FIG. 8, depicted is a methodology 800 that can facilitate accessing data associated with memory components in accordance with an aspect of the disclosed subject matter. At 802, a command(s) can be provided. In one aspect, a processor component 302 can generate and/or provide a command(s), such as search commands, that can include information that can facilitate performing an operation (e.g., read, write, verify, erase) associated with a memory component(s) (e.g., 102, 104, 106, 152, 154, 156). The command information can include memory component information, memory address information (e.g., LBAs), bus information, and/or other information, as more fully described herein, for example, with regard to system 100, system 300, and/or methodology 700. In accordance with one embodiment, the memory component can comprise a nonvolatile memory (e.g., single-bit flash memory, multi-bit flash memory).

At 804, the command information can be received. In one aspect, the command information can be received by a respective memory component based in part on the command information. For example, memory component$_1$ 102 can receive a command(s) directed to that memory component$_1$ 102, memory component$_2$ 104 can receive a command(s) directed to that memory component$_2$ 104, and/or memory component$_n$ 106 can receive a command(s) directed to that memory component$_n$ 106. At 806, the respective memory array of a respective memory component can be searched to locate the desired memory locations (e.g., the desired LBAs and physical location(s) associated therewith). At 808, memory location(s) in a respective memory component can be located based in part on the command(s). For example, a command can specify an LBA(s) in the memory, and the respective memory component can locate the physical location (e.g., block number, page number, etc.) of the desired LBAs in its respective memory array (e.g., 108, 110, 112).

At 810, information regarding the memory location(s) associated with the command(s) can be provided. For instance, each memory component that received a command(s) can provide information to a processor component 302 regarding the physical location(s) associated with the LBA(s) specified in the respective search command(s).

At 812, a transfer map can be generated. In one aspect, a map component (e.g., 310) associated with the processor component 302 can generate a transfer map based in part on the search results received from the respective memory components. In one aspect, with regard to the desired data, the transfer map can specify the LBA(s) and associated PBA(s) of portions of desired data as well as the particular memory component in which such portions of desired data is stored. At 814, the transfer map can be transmitted. For example, the processor component 302 can transfer the transfer map to a transfer controller component 114, which can store the transfer map therein.

At 816, one or more commands (e.g., load and transfer commands) can be generated. For instance, the processor component 302 can generate one or more commands to respective memory components based in part on the search results received from the memory components and/or the transfer map. The commands can be provided to the respective memory components, as specified in respective commands.

At 818, the data associated with the command(s) can be loaded and/or transferred. In one aspect, each memory component that contains data desired by the processor component can receive one or more commands, respectively, which can be stored in a respective queue component. Each memory component can service its commands stored in its queue component, as based on each command, each memory component can retrieve data from the physical locations, load the data into its buffer components, and transfer such data to the transfer controller component (e.g., 114). In another aspect, the transfer controller component can service its commands independent from the other memory components, such that a particular memory component that completes a load and transfer of a current command can proceed to service the next command in its queue component, if any, even if the another memory component(s) has not completed its load and transfer associated with a current command. The respective memory components can continue to service their respective commands and can load and transfer data associated with the commands until the desired data is transferred to the transfer controller component 114.

At 820, the data transferred to the transfer controller component 114 can be transmitted. In one aspect, the data transferred to the transfer controller component 114 can be transmitted to a processor component 302 in a proper order based in part on the transfer map. At this point, methodology 800 can end.

Figure 9:
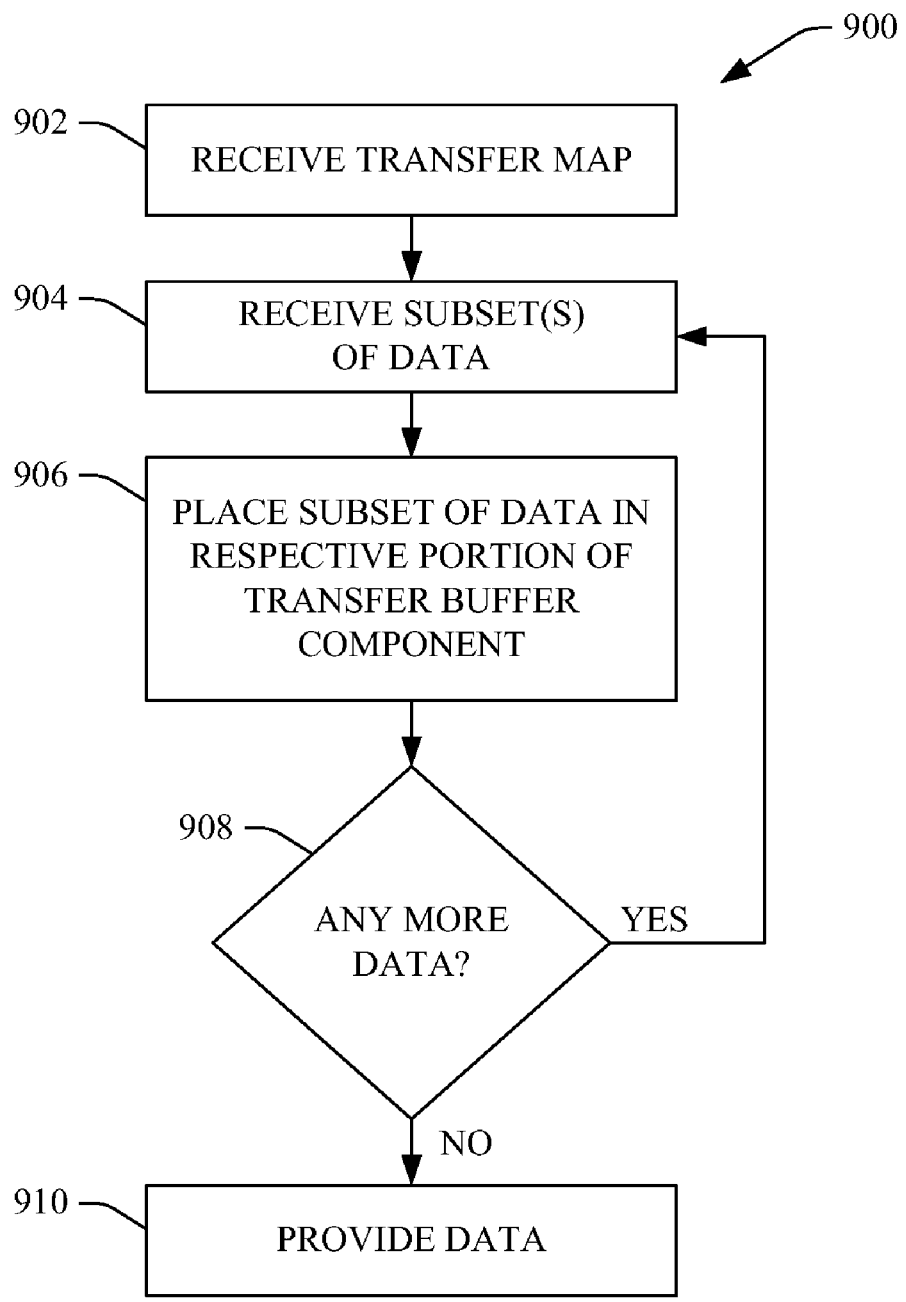
FIG. 9 depicts a methodology that employ a transfer map to facilitate arranging data to facilitate transferring data associated with memory components in accordance with an aspect of the disclosed subject matter.

FIG. 9 depicts a methodology 900 that can facilitate searching for information to facilitate accessing a memory in accordance with an aspect of the disclosed subject matter. At 902, a transfer map(s) (e.g., 404) can be received. In one aspect, a transfer controller component (e.g., 114, 164) can receive a transfer map from a processor component (e.g., 302). The transfer map can be based in part on search results to locate physical locations in one or more memory components (e.g., 102, 104, 106, 152, 154, 156) that can be associated with respective LBAs. The transfer map can include information, such as the LBAs desired by the processor component and the corresponding physical location (e.g., memory component identification, block location, page number, etc.) of each LBA. In another aspect, the transfer map can be stored in a storage component (e.g., 406) in and/or associated with the transfer controller component.

At 904, a subset of data can be received. In accordance with an aspect, the subset of data can be received by the transfer controller component from one or more of the memory components. The subset of data can be retrieved from a respective memory component based in part on load and transfer commands from the processor component, where the load and transfer commands can be based in part on the search results to locate the physical location(s) associated with a desired LBA(s) in a respective memory component.

For example, a search result can provide that LBAs 20-27 are physically located in memory component$_1$ 102 in block 10, page 25. The processor component can generate a load and transfer command and transmit it to memory component1 to load and transfer the information associated with block 10, page 25. The controller component (e.g., 304) can facilitate retrieving the data (e.g., subset of data) stored in block 10, page 25, and can transfer such data to the transfer controller component.

At 906, the subset of data can be placed (e.g., stored) in a respective portion of the transfer buffer based in part on the transfer map. In one aspect, the transfer controller component can place the subset of data in a particular location in the transfer buffer based in part on information contained in the transfer map. For instance, continuing with the above example, the transfer map can provide that LBAs 20-27 is the first subset of data of all data desired by the processor component associated with a particular read operation. The transfer map can also include information that the LBAs 20-27 are associated with the memory component$_1$ 102 at block 10, page 25 therein. Based in part on the transfer map information, the transfer controller component can place the received subset of data in the proper order (e.g., proper location) in the transfer buffer component to facilitate proper ordering of all data associated with the particular read command.

At 908, a determination can be made as to whether there is any more data to be received. For example, the transfer controller component can analyze the transfer map and the data stored in the transfer buffer component to determine whether all data associated with a particular operation (e.g., read operation) has been received. If it is determined that there is more data to be received before the operation is complete, methodology 900 can return to reference numeral 904, where one or more other subsets of data can be received as each subset of data is loaded and transferred from a respective memory component to the transfer controller component. Methodology 900 can continue to proceed from that point.

If, at 908, it is determined that there is no more data to be received with respect to a particular operation, for example, based in part on the transfer map, at 910, the data can be provided as an output. For instance, the transfer controller component can determine, based in part on the transfer map, that all data associated with a particular operation (e.g., and transfer map) has been received and stored in the transfer buffer component. The transfer controller component can place the respective subsets of data in the transfer component buffer in the proper order based in part on the transfer map. As all data associated with the transfer map is received and placed in the transfer buffer component, the transfer controller can indicate to the processor component that the data associated with the transfer map is ready to be transferred to the processor component. The data associated with the transfer map can be provided to the processor component in proper order. At this point, methodology 900 can end.

Figure 10:
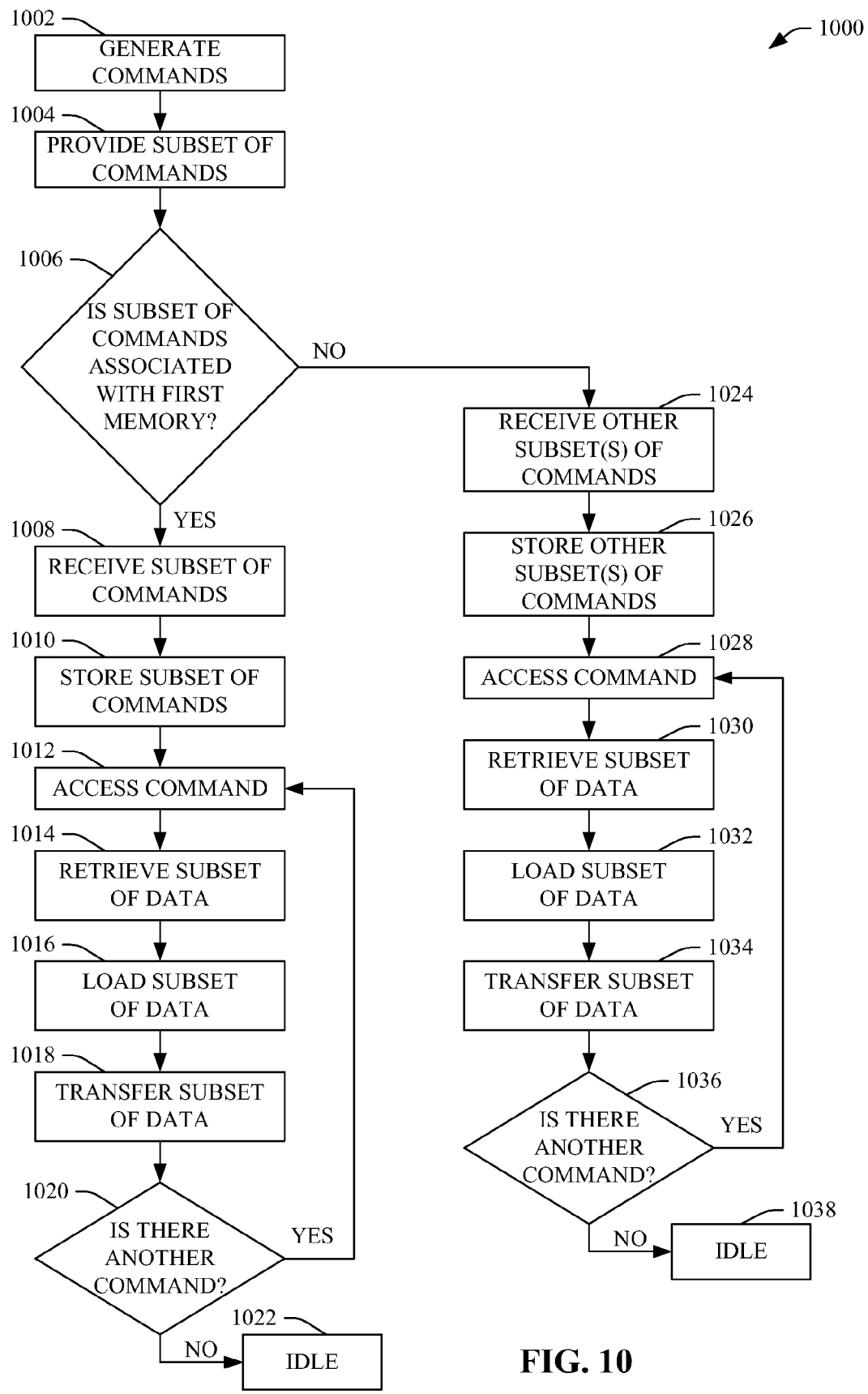
FIG. 10 illustrates a methodology that can facilitate transferring data associated with memory components in accordance with an aspect of the subject matter disclosed herein.

Turning to FIG. 10, illustrated is a methodology 1000 that can facilitate accessing data associated with memory components in accordance with an aspect of the disclosed subject matter. At 1002, a command(s) can be generated. In one aspect, a processor component 302 can generate one or more commands, where a subset of the commands can be generated with regard to respective memory components (e.g., 102, 104, 106, 152, 154, 156). For example, the commands can be load and transfer commands that can be based in part on search result information received from the one or more memory components, where the search result information can include physical location information respectively associated with LBAs desired to be accessed by the processor component to perform an operation(s) (e.g., read, write, verify, erase) on the physical locations in the memory component(s). The command information can include memory component information to facilitate identifying a particular memory component wherein a desired physical location(s) and/or data resides, physical location information (e.g., PBA), such as a block location (e.g., block number) and page number desired to be accessed (e.g., to read data), bus information, and/or other information, as more fully described herein, for example, with regard to system 100, system 300, system 400, and/or methodology 700. In accordance with one embodiment, a memory component(s) can comprise a nonvolatile memory (e.g., single-bit flash memory, multi-bit flash memory).

At 1004, a subset(s) of command(s) can be provided. In one aspect, the processor component can provide the commands, or respective subsets of commands, to each of the one or more memory components. For example, a first subset of commands can be provided to a first memory component (e.g., memory component$_1$ 102) to access desired physical location (s) and/or data therein based in part on memory component identification and/or routing information associated with each command; and another subset(s) of commands can be provided to another memory component (e.g., memory component$_2$ 104) to access desired physical location(s) and/or data therein based in part on memory component identification and/or routing information associated with each command.

At 1006, a determination can be made as to whether a subset of commands is associated with a first memory component, or with another memory component. For instance, each command associated with a subset of commands can include information identifying and/or routing the command to a particular component, such as a first memory component. If the subset of commands is associated with the first memory component, at 1008, the subset of commands can be received by the first memory component. At 1010, the subset of commands can be stored. In one embodiment, the first memory component can comprise a queue component (e.g., queue component$_1$ 118) wherein the subset of commands can be stored, for example, in the order received from the processor component. In accordance with another embodiment, the queue component (e.g., queue component$_1$ 158) can be located in the transfer controller component (e.g., 164) and the subset of commands can be stored in the queue component, for example, in the order received from the processor component. In one aspect, the commands of the subset can be serviced in a first-in-first-out (FIFO) order.

At 1012, a command can be accessed and/or retrieved. In one aspect, the controller component of the first memory component can access and/or retrieve a command from the first queue component. The command can specify a physical location (e.g., PBA) in the first memory component wherein the desired piece of data can be stored. At 1014, a subset of data, which can be data associated with the command, can be retrieved from the physical location specified in the command. At 1016, the subset of data can be loaded into a buffer component (e.g., 316) associated with the first memory component.

At 1018, the subset of data can be transferred to the transfer controller component. In one aspect, the controller component of the first memory component can provide an indication to the transfer controller component that the data is loaded and ready to be provided to the transfer controller component.

At 1020, a determination can be made as to whether there is another command in the first subset of commands. If it is determined that there is no other command in the first subset of commands, at 1022, the first memory component can idle. For instance, the controller component of the first memory component can examine its associated queue component to determine whether there is another command in the queue component. If the controller component determines that there is no command in the queue component, the first memory component can idle. If, at 1020, it is determined that there is another command in the first subset of commands, methodology 1000 can return to reference numeral 1012 to access the other command. For instance, the controller component of the first memory component can examine its queue component to determine whether there is another command in the queue component, if the controller component determines that there is another command in the queue component, the controller component can access and/or retrieve the next command in the queue component and can proceed to service the next command.

Returning back to reference numeral 1006, if, at 1006, it is determined that the subset of commands is not associated with the first memory component, at 1024, the subset of commands can be received by another memory component. At 1026, the subset of commands can be stored. In one embodiment, the other memory component can comprise a queue component (e.g., queue component$_2$ 120) wherein the subset of commands can be stored, for example, in the order received from the processor component. In another embodiment, the queue component (e.g., queue component$_2$ 170) can be associated with the other memory component but located in the transfer controller component (e.g., 164) and the subset of commands can be stored in such queue component, for example, in the order received from the processor component. In one aspect, the commands of the subset can be serviced by the other memory component in a FIFO order.

At 1028, a command can be accessed and/or retrieved. In one aspect, the controller component of the other memory component can access and/or retrieve a command from the associated queue component. The command can specify a physical location (e.g., PBA) in the other memory component wherein a desired subset of data can be stored. At 1030, the subset of data, which can be data associated with the command, can be retrieved from the physical location specified in the command. At 1032, the subset of data can be loaded into a buffer component in and/or associated with the other memory component. At 1034, the subset of data can be transferred to the transfer controller component. In one aspect, the controller component of the other memory component can provide an indication to the transfer controller component that the data is loaded and ready to be provided to the transfer controller component.

At 1036, a determination can be made as to whether there is another command in the subset of commands in the queue component of the other memory component. If it is determined that there is no other command in such subset of commands and/or in the queue component, at 1038, the other memory component can idle. For instance, the controller component of the other memory component can examine its associated queue component to determine whether there is another command in the queue component. If the controller component determines that there is no command in the queue component, the other memory component can idle. If, at 1036, it is determined that there is another command in the subset of commands associated with the other memory component, methodology 1000 can return to reference numeral 1028 to access the other command. For instance, the controller component of the other memory component can examine its associated queue component to determine whether there is another command in the queue component, and if the controller component determines that there is another command in the queue component, the controller component can access and/or retrieve the next command in the queue component and can proceed to service the next command.

Methodology 1000 can continue until all the commands in the respective queue components of the memory components are serviced and the data loaded and transferred to the transfer buffer component of the transfer controller component.

It is to be appreciated and understood that the subject innovation is not limited by the acts illustrated and/or by the order of acts, as, for example, acts can occur in various orders and/or concurrently, and with other acts not presented and described herein. In one aspect, the memory component and the at least one other memory component can operate in parallel and/or an interleaved manner to service their respective subset of commands, such that each memory component can service its respective subset of commands at the same or substantially the same time as the other memory component(s) services its respective subset of commands to facilitate improved data access and retrieval.

In accordance with one embodiment, the data transfers can be de-centralized, such that each memory component can contain its own transfer buffer component, which can receive and store data associated with its subset of commands. Each memory component can provide the data stored in its transfer buffer component when all commands in its queue have been serviced. The data can be received from the memory components by the transfer controller component, and the transfer controller component can place the received data in its proper order in its transfer buffer component based in part on the transfer map. The transfer controller component can then transmit the data to the processor component.

The subject innovation can facilitate improved memory access and data retrieval, as compared to conventional systems, as each memory component can service data requests (e.g., commands in its queue) independent of the other memory components and/or can facilitate transferring the data to the transfer controller component, even when another memory component(s) has not finished servicing any or all of its respective subset of commands. At this point, methodology 1000 can end.

Figure 11:
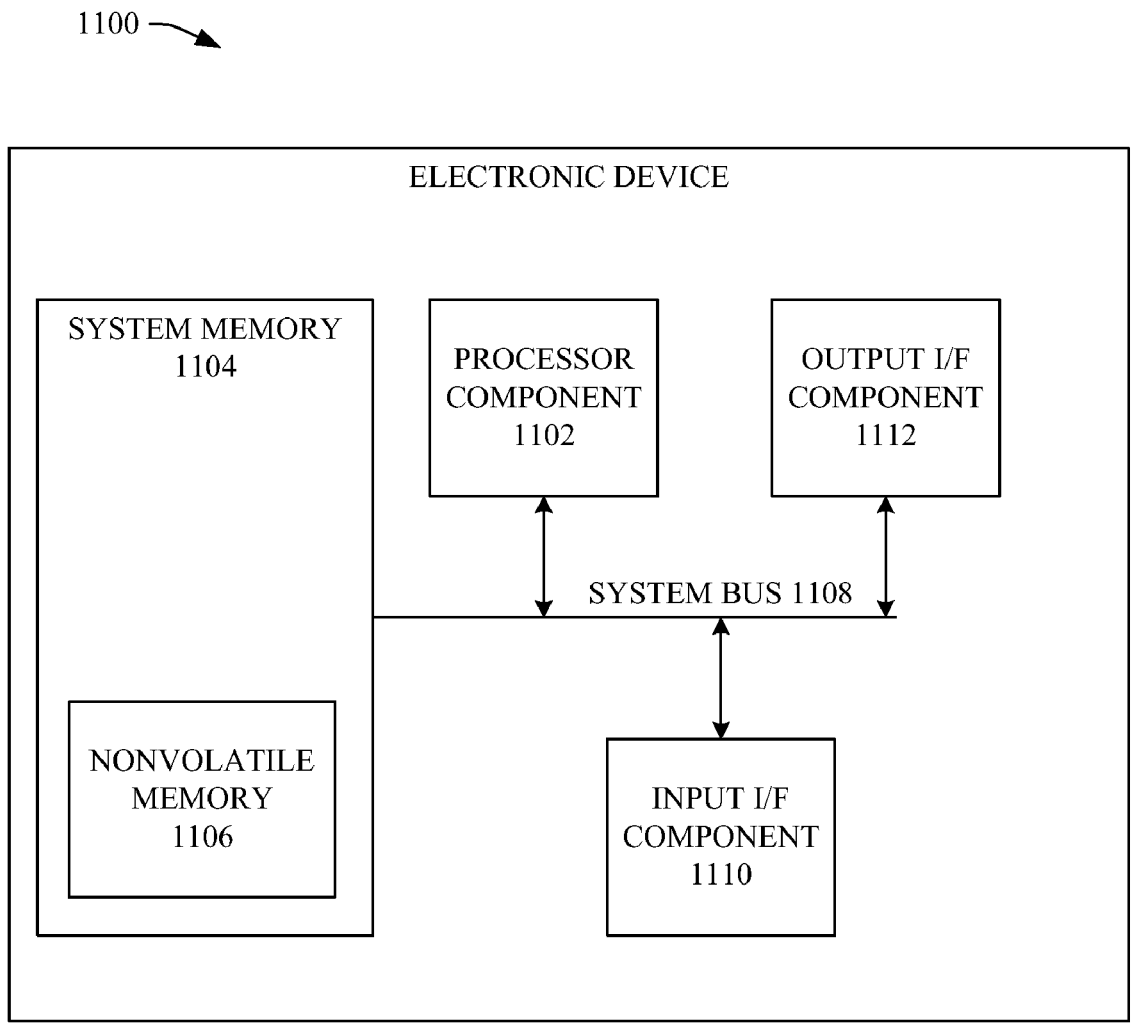
FIG. 11 illustrates an example of an electronic device that can be associated with a memory in accordance with an aspect of the disclosed subject matter.

Referring to FIG. 11, illustrated is a block diagram of an exemplary, non-limiting electronic device 1100 that can comprise and/or incorporate system 100, system 150, system 300, system 400, and/or system 500, or a respective portion(s) thereof. The electronic device 1100 can include, but is not limited to, a computer, a laptop computer, network equipment (e.g., routers, access points), a media player and/or recorder (e.g., audio player and/or recorder, video player and/or recorder), a television, a smart card, a phone, a cellular phone, a smart phone, an electronic organizer, a PDA, a portable email reader, a digital camera, an electronic game (e.g., video game), an electronic device associated with digital rights management, a Personal Computer Memory Card International Association (PCMCIA) card, a trusted platform module (TPM), a Hardware Security Module (HSM), a set-top box, a digital video recorder, a gaming console, a navigation system or device (e.g., global position satellite (GPS) system), a secure memory device with computational capabilities, a device with a tamper-resistant chip(s), an electronic device associated with an industrial control system, an embedded computer in a machine (e.g., an airplane, a copier, a motor vehicle, a microwave oven), and the like.

Components of the electronic device 1100 can include, but are not limited to, a processor component 1102 (e.g., which can be and/or can include the same or similar functionality as processor component 302, as depicted in FIG. 3 and described herein), a system memory 1104, which can contain a nonvolatile memory 1106, and a system bus 1108 that can couple various system components including the system memory 1104 to the processor component 1102. The system bus 1108 can be any of several types of bus structures including a memory bus or memory controller, a peripheral bus, or a local bus using any of a variety of bus architectures.

Electronic device 1100 can typically include a variety of computer readable media. Computer readable media can be any available media that can be accessed by the electronic device 1100. By way of example, and not limitation, computer readable media can comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, nonvolatile memory 1106 (e.g., flash memory), or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by electronic device 1100. Communication media typically embodies computer readable instructions, data structures, program modules or other data in a modulated data signal such as a carrier wave or other transport mechanism and includes any information delivery media.

The system memory 1104 can include computer storage media in the form of volatile (e.g., SRAM) and/or nonvolatile memory 1106 (e.g., flash memory). For example, nonvolatile memory 1106 can comprise one or more memory components that can be the same or similar, or can contain the same or similar functionality, as memory component$_1$ 102, memory component$_2$ 104, and/or memory component$_n$ 106 (e.g., as described with regard to system 100, system 300, system 400, etc.). A basic input/output system (BIOS), containing the basic routines that can facilitate transferring information between elements within electronic device 1100, such as during start-up, can be stored in the system memory 1104. The system memory 1104 typically also can contain data and/or program modules that can be accessible to and/or presently be operated on by the processor component 1102. By way of example, and not limitation, the system memory 1104 can also include an operating system(s), application programs, other program modules, and program data.

The nonvolatile memory 1106 can be removable or non-removable. For example, the nonvolatile memory 1106 can be in the form of a removable memory card or a USB flash drive. In accordance with one aspect, the nonvolatile memory 1106 can include flash memory (e.g., single-bit flash memory, multi-bit flash memory), ROM, PROM, EPROM, EEPROM, or NVRAM (e.g., FeRAM), or a combination thereof, for example. Further, a flash memory can comprise NOR flash memory and/or NAND flash memory.

A user can enter commands and information into the electronic device 1100 through input devices (not shown) such as a keypad, microphone, tablet, or touch screen although other input devices can also be utilized. These and other input devices can be connected to the processor component 1102 through input interface component 1110 that can be connected to the system bus 1108. Other interface and bus structures, such as a parallel port, game port or a universal serial bus (USB) can also be utilized. A graphics subsystem (not shown) can also be connected to the system bus 1108. A display device (not shown) can be also connected to the system bus 1108 via an interface, such as output interface component 1112, which can in turn communicate with video memory. In addition to a display, the electronic device 1100 can also include other peripheral output devices such as speakers (not shown), which can be connected through output interface component 1112.

In accordance with one aspect, the electronic device 1100 can contain a transfer controller component 114 (e.g., as illustrated in FIGS. 1A, 3, and/or 4, and described herein) (or transfer controller component 164, as illustrated in FIG. 1B and described herein) (not shown in FIG. 11), a transfer buffer component 116 (e.g., as illustrated in FIGS. 1A, 3, and/or 4, and described herein) (or a transfer buffer component 166, as illustrated in FIG. 1B and described herein) (not shown in FIG. 11), and/or other transfer buffer components (e.g., distributed in the nonvolatile memory in a de-centralized manner) (not shown in FIG. 11), wherein each component can be the same or similar, and/or can comprise the same or similar functionality, as respective components as more fully described herein, for example, with regard to system 100, system 150, system 300, system 400, etc.

It is to be understood and appreciated that the computer-implemented programs and software can be implemented within a standard computer architecture. While some aspects of the disclosure have been described above in the general context of computer-executable instructions that can be run on one or more computers, those skilled in the art will recognize that the technology also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices (e.g., PDA, phone), microprocessor-based or programmable consumer electronics, and the like, each of which can be operatively coupled to one or more associated devices.

The illustrated aspects of the disclosure may also be practiced in distributed computing environments where certain tasks are performed by remote processing devices that are linked through a communications network. In a distributed computing environment, program modules can be located in both local and remote memory storage devices.

It is also to be understood and appreciated that cryptographic protocols can be employed to facilitate security of data associated with a memory (e.g., memory component$_1$ 102) in accordance with the disclosed subject matter. For example, a cryptographic component (e.g., cryptographic engine) can be employed and can facilitate encrypting and/or decrypting data to facilitate securing data being written to, stored in, and/or read from the memory. The cryptographic component can provide symmetric cryptographic tools and accelerators (e.g., Twofish, Blowfish, AES, TDES, IDEA, CAST5, RC4, etc.) to facilitate securing data. The cryptographic component can also provide asymmetric cryptographic accelerators and tools (e.g., RSA, Digital Signature Standard (DSS), and the like) to facilitate securing data. Additionally, the cryptographic component can provide accelerators and tools (e.g., Secure Hash Algorithm (SHA) and its variants such as, for example, SHA-0, SHA-1, SHA-224, SHA-256, SHA-384, and SHA-512) to facilitate securing data.

It is to be appreciated and understood that authentication protocols can be employed to facilitate security of data associated with the memory (e.g., memory component$_1$ 102) in accordance with the disclosed subject matter. For example, an authentication component can solicit authentication data from an entity, and, upon the authentication data so solicited, can be employed, individually and/or in conjunction with information acquired and ascertained as a result of biometric modalities employed, to facilitate control access to the memory. The authentication data can be in the form of a password (e.g., a sequence of humanly cognizable characters), a pass phrase (e.g., a sequence of alphanumeric characters that can be similar to a typical password but is conventionally of greater length and contains non-humanly cognizable characters in addition to humanly cognizable characters), a pass code (e.g., Personal Identification Number (PIN)), and the like, for example. Additionally and/or alternatively, public key infrastructure (PKI) data can also be employed by the authentication component. PKI arrangements can provide for trusted third parties to vet, and affirm, entity identity through the use of public keys that typically can be certificates issued by the trusted third parties. Such arrangements can enable entities to be authenticated to each other, and to use information in certificates (e.g., public keys) and private keys, session keys, Traffic Encryption Keys (TEKs), cryptographic-system-specific keys, and/or other keys, to encrypt and decrypt messages communicated between entities.

The authentication component can implement one or more machine-implemented techniques to identify an entity by its unique physical and behavioral characteristics and attributes. Biometric modalities that can be employed can include, for example, face recognition wherein measurements of key points on an entity's face can provide a unique pattern that can be associated with the entity, iris recognition that measures from the outer edge towards the pupil the patterns associated with the colored part of the eye—the iris—to detect unique features associated with an entity's iris, and finger print identification that scans the corrugated ridges of skin that are non-continuous and form a pattern that can provide distinguishing features to identify an entity.

As utilized herein, terms "component," "system," "interface," and the like, are intended to refer to a computer-related entity, either hardware, software (e.g. in execution), and/or firmware. For example, a component can be a process running on a processor, a processor, an object, an executable, a program, and/or a computer. By way of illustration, both an application running on a server and the server can be a component. One or more components can reside within a process and a component can be localized on one computer and/or distributed between two or more computers.

Furthermore, the disclosed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the disclosed subject matter.

Some portions of the detailed description have been presented in terms of algorithms and/or symbolic representations of operations on data bits within a computer memory. These algorithmic descriptions and/or representations are the means employed by those cognizant in the art to most effectively convey the substance of their work to others equally skilled. An algorithm is here, generally, conceived to be a self-consistent sequence of acts leading to a desired result. The acts are those requiring physical manipulations of physical quantities. Typically, though not necessarily, these quantities take the form of electrical and/or magnetic signals capable of being stored, transferred, combined, compared, and/or otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the foregoing discussion, it is appreciated that throughout the disclosed subject matter, discussions utilizing terms such as processing, computing, calculating, determining, and/or displaying, and the like, refer to the action and processes of computer systems, and/or similar consumer and/or industrial electronic devices and/or machines, that manipulate and/or transform data represented as physical (electrical and/or electronic) quantities within the computer's and/or machine's registers and memories into other data similarly represented as physical quantities within the machine and/or computer system memories or registers or other such information storage, transmission and/or display devices.

What has been described above includes examples of aspects of the disclosed subject matter. It is, of course, not possible to describe every conceivable combination of components or methodologies for purposes of describing the disclosed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has," or "having," or variations thereof, are used in either the detailed description or the claims, such terms are intended to be inclusive in a manner similar to the term "comprising" as "comprising" is interpreted when employed as a transitional word in a claim.

What is claimed is:

1. A system that facilitates transfers of data associated with at least one memory, comprising:
   the at least one memory that contains a plurality of memory locations to facilitate storage of data, the at least one memory that services a subset of commands to facilitate transfers of data;
   a transfer controller component that facilitates control of transfers of data associated with the at least one memory based in part on a predefined data order, wherein the transfer controller component stores the data in the predefined data order based in part on a transfer map; and
   a processor component that generates a transfer map based in part on search result information received from respective memory components in response to a search command, wherein the transfer map includes information identifying a memory component in which a portion of desired data resides, logical block address associated with each respective portion of the data and physical block address associated with each respective portion of the data.

2. The system of claim 1, further comprising: at least one queue component that is associated with the at least one memory, wherein the at least one queue component stores the subset of commands, and the at least one memory services each command in the queue component to facilitate transfers of data.

3. The system of claim 2, the at least one memory comprises more than one memory and the at least one queue component comprises more than one queue component, each memory retrieves respective commands from a respective queue component and services the respective commands in a parallel manner with respect to at least one other memory.

4. The system of claim 3, further comprising transfer buffer components that are respectively associated with each memory and the transfer controller component, each memory loads data associated with the respective commands from the respective queue component into its respective transfer component and transfers such data to the transfer buffer component associated with the transfer controller component after the respective commands from the respective queue component are serviced.

5. The system of claim 1, the transfer controller component comprises a transfer buffer component that stores data received from the at least one memory.

6. The system of claim 1, wherein the transfer map is stored on the transfer controller component.

7. The system of claim 1, further comprising a processor component that generates commands and facilitates execution of operations associated with the at least one memory, the processor component generates a subset of search commands to facilitate location of a respective physical block addresses in the at least one memory based in part on logical block addresses respectively associated with the physical block addresses.

8. The system of claim 7, the processor component further comprises a map component that receives information associated with results of the search commands to facilitate generation of the transfer map.

9. The system of claim 7, the processor component generates the subset of commands and provides the subset of commands to the at least one memory, the subset of commands facilitate transfer of data to the processor component.

10. The system of claim 1, the at least one memory further comprising:
at least one memory array that contains the plurality of memory locations;
at least one buffer component; and
at least one controller component that facilitates control of retrieval of data from the at least one memory array and storage of data in the at least one buffer component.

11. The system of claim 10, the at least one controller component provides information to the transfer controller component that indicates that the at least one memory has data ready for transfer to the transfer controller component.

12. An electronic device comprising the system of claim 1.

13. The electronic device of claim 12, the electronic device is one of a computer, a cellular phone, a digital phone, a video device, a smart card, a personal digital assistant, a television, an electronic game, a digital camera, an electronic organizer, an audio player, an audio recorder, an electronic device associated with digital rights management, a Personal Computer Memory Card International Association (PCMCIA) card, a trusted platform module (TPM), an electronic control unit associated with a motor vehicle, a global positioning satellite (GPS) device, an electronic device associated with an airplane, an electronic device associated with an industrial control system, a Hardware Security Module (HSM), a set-top box, a secure memory device with computational capabilities, or an electronic device with at least one tamper-resistant chip.

14. A method that facilitates transferring data associated with at least one memory, comprising:
transferring subsets of data based in part on subsets of commands;
arranging the subsets of data in an order based in part on a predefined data order to facilitate data transfers associated with the at least one memory, wherein the subsets of data are stored in the predefined data order based in part on a transfer map; and
receiving a transfer map including information identifying a memory component in which a portion of desired data resides, logical block address associated with each respective portion of the data and physical block address associated with each respective portion of the data, wherein the transfer map based in part on search result information received from respective memory components in response to a search command.

15. The method of claim 14, further comprising:
receiving the transfer map from a processor;
receiving at least one subset of data;
placing the at least one subset of data in a corresponding portion of a transfer buffer component;
determining whether there is any more subsets of data associated with an operation; and
providing data, the data comprising the at least one subset of data.

16. The method of claim 14, further comprising:
generating at least one search command;
searching for at least one memory location based in part on the at least one search command;
locating the at least one memory location;
providing information regarding the at least one memory location;
generating the transfer map; and
transmitting the transfer map.

17. The method of claim 16, further comprising:
generating the subsets of commands based in part on information regarding the at least one memory location;
loading the subsets of data based in part on the subsets of commands;
transferring the subsets of data.

18. The method of claim 14, further comprising:
receiving a first subset of commands associated with a first memory;
storing the first subset of commands;
loading a first subset of data associated with a first command of the first subset of commands;
transferring the first subset of data associated with the first command;
loading at least one other subset of data associated with at least one other command of the first subset of commands; and
transferring the at least one other subset of data.

19. The method of claim 18, further comprising:
receiving at least one subset of disparate commands associated with at least one other memory;
storing the at least one other disparate subset of commands;

loading at least one subset of disparate data associated with a first command of the disparate subset of commands;

transferring the at least one subset of disparate data associated with the first command of the disparate subset of commands;

loading at least one other subset of disparate data associated with at least one other disparate command of the subset of disparate commands; and transferring the at least one other subset of disparate data.

20. The method of claim 19, further comprising:

performing at least one of loading a first subset of data associated with a first command of the first subset of commands, transferring the first subset of data associated with the first command, loading at least one other subset of data associated with at least one other command of the first subset of commands, or transferring the at least one other subset of data, in parallel with at least one of loading at least one subset of disparate data associated with a first command of the disparate subset of commands, transferring the at least one subset of disparate data associated with the first command of the disparate subset of commands, loading at least one other subset of disparate data associated with at least one other disparate command of the subset of disparate commands, or transferring the at least one other subset of disparate data.

* * * * *